US012040971B2

(12) United States Patent
Sutton et al.

(10) Patent No.: US 12,040,971 B2
(45) Date of Patent: *Jul. 16, 2024

(54) NAME-BASED ROUTING THROUGH NETWORKS

(71) Applicant: Level 3 Communications, LLC, Broomfield, CO (US)

(72) Inventors: David Sutton, Monroe, LA (US); Steve Toms, Middleburg, FL (US); Shelley Goldner, Superior, CO (US); Shelli L. Hurd, Arvada, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/382,240

(22) Filed: Oct. 20, 2023

(65) Prior Publication Data

US 2024/0113964 A1    Apr. 4, 2024

Related U.S. Application Data

(63) Continuation of application No. 17/961,825, filed on Oct. 7, 2022, now Pat. No. 11,799,770.

(60) Provisional application No. 63/410,750, filed on Sep. 28, 2022.

(51) Int. Cl.
*H04L 45/42* (2022.01)
*H04L 9/40* (2022.01)
(Continued)

(52) U.S. Cl.
CPC .......... *H04L 45/42* (2013.01); *H04L 41/0627* (2013.01); *H04L 41/0631* (2013.01);
(Continued)

(58) Field of Classification Search
CPC . H04L 45/42; H04L 41/0627; H04L 41/0631; H04L 45/02; H04L 45/306; H04L 45/54; H04L 63/0236
(Continued)

(56) References Cited

U.S. PATENT DOCUMENTS 8,204,982 B2 * 6/2012 Casado ................. H04L 63/10
709/224
8,478,812 B2 * 7/2013 Oliver .................. H04L 67/303
709/221

(Continued)

*Primary Examiner* — Anthony Mejia

(57) ABSTRACT

Novel tools and techniques are provided for implementing name-based routing through networks. In various embodiments, a broker manager in each of a plurality of networks may receive a subscription request for a network device from a client device, each device being locally accessible or disposed in an upstream or downstream network. The broker manager uses its client broker to communicate with a locally accessible client device, and uses its mediator broker (and, sometimes, an intermediate device(s)) to communicate with a locally accessible network device. The broker manager otherwise uses its messaging brokers to communicate with control channels of one or more networks. Once subscription with the network device has been established, any commands and responses between the client device and the network device may be routed over pub/sub channels via the broker managers and their brokers using name-based routing, without routing based on IP address of the network device.

20 Claims, 14 Drawing Sheets

(51) Int. Cl.
  *H04L 41/0604* (2022.01)
  *H04L 41/0631* (2022.01)
  *H04L 45/00* (2022.01)
  *H04L 45/02* (2022.01)
  *H04L 45/302* (2022.01)

(52) U.S. Cl.
  CPC ............ *H04L 45/02* (2013.01); *H04L 45/306* (2013.01); *H04L 45/54* (2013.01); *H04L 63/0236* (2013.01)

(58) Field of Classification Search
  USPC ........................................................ 709/238
  See application file for complete search history.

(56) References Cited

U.S. PATENT DOCUMENTS

| | | | |
|---|---|---|---|
| 9,846,861 B2 * | 12/2017 | Weber ...................... | H04L 67/02 |
| 2006/0056328 A1 * | 3/2006 | Lehane ................... | H04L 45/02 |
| | | | 370/315 |
| 2008/0183840 A1 * | 7/2008 | Khedouri ........... | H04N 21/4788 |
| | | | 709/217 |
| 2012/0246340 A1 * | 9/2012 | Ross ................... | H04L 12/1859 |
| | | | 709/244 |
| 2013/0227284 A1 * | 8/2013 | Pfeffer ............. | H04N 21/64322 |
| | | | 713/168 |
| 2022/0239696 A1 * | 7/2022 | Konda ................ | H04L 61/4511 |
| 2022/0286431 A1 * | 9/2022 | Winn ..................... | H04L 63/20 |

* cited by examiner

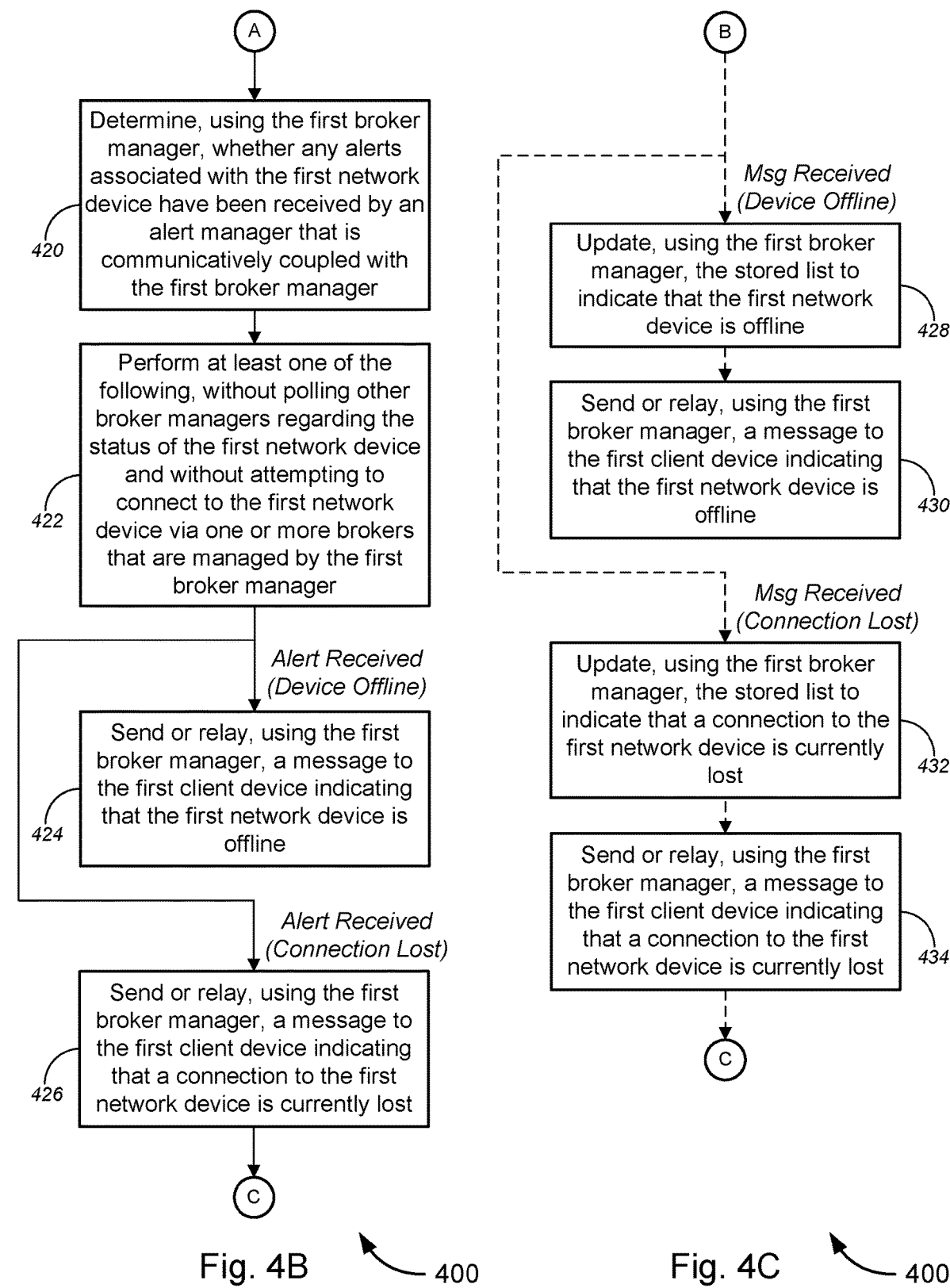

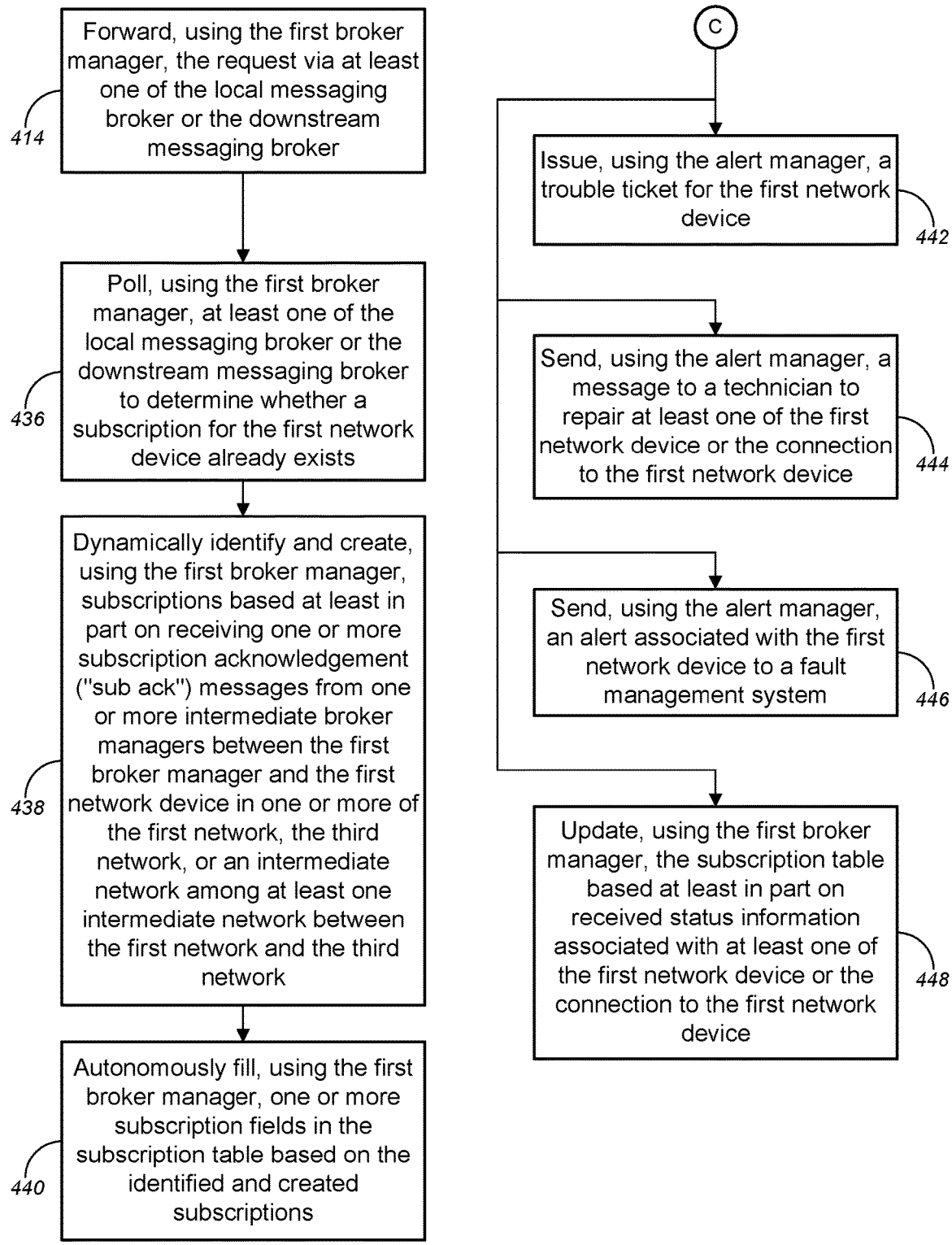

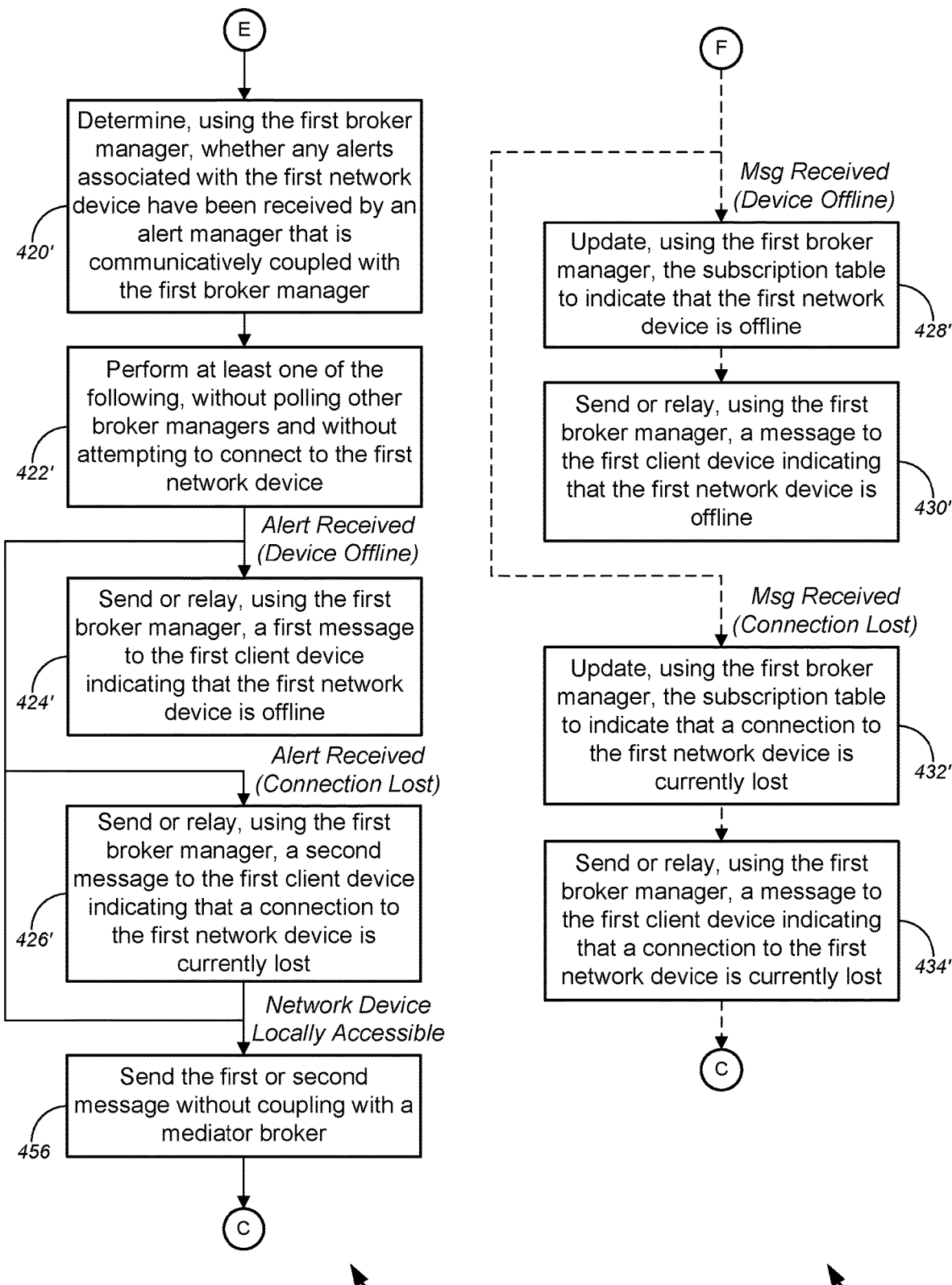

NAME-BASED ROUTING THROUGH NETWORKS

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing network routing, and, more particularly, to methods, systems, and apparatuses for implementing name-based routing through networks.

BACKGROUND

Conventional network routing techniques are based on routing using Internet Protocol ("IP") addresses. However, there is a very limited number of IP addresses, which means that different networks can use the same IP address for different devices, thus leading to IP conflicts.

Hence, there is a need for more robust and scalable solutions for implementing network routing, and, more particularly, to methods, systems, and apparatuses for implementing name-based routing through networks.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components. For denoting a plurality of components, the suffixes "a" through "n," where n denotes any suitable integer number, and may be either the same or different from the suffix "n" for other components in the same or different figures. For example, for component #1 105a-105n, the integer value of n in 105n may be the same or different from the integer value of n in 110n for component #2 110a-110n, and so on.

FIGS. 4A-4J are flow diagrams illustrating a method for implementing name-based routing through networks, in accordance with various embodiments.

DETAILED DESCRIPTION OF CERTAIN EMBODIMENTS

Overview

Figure 1:
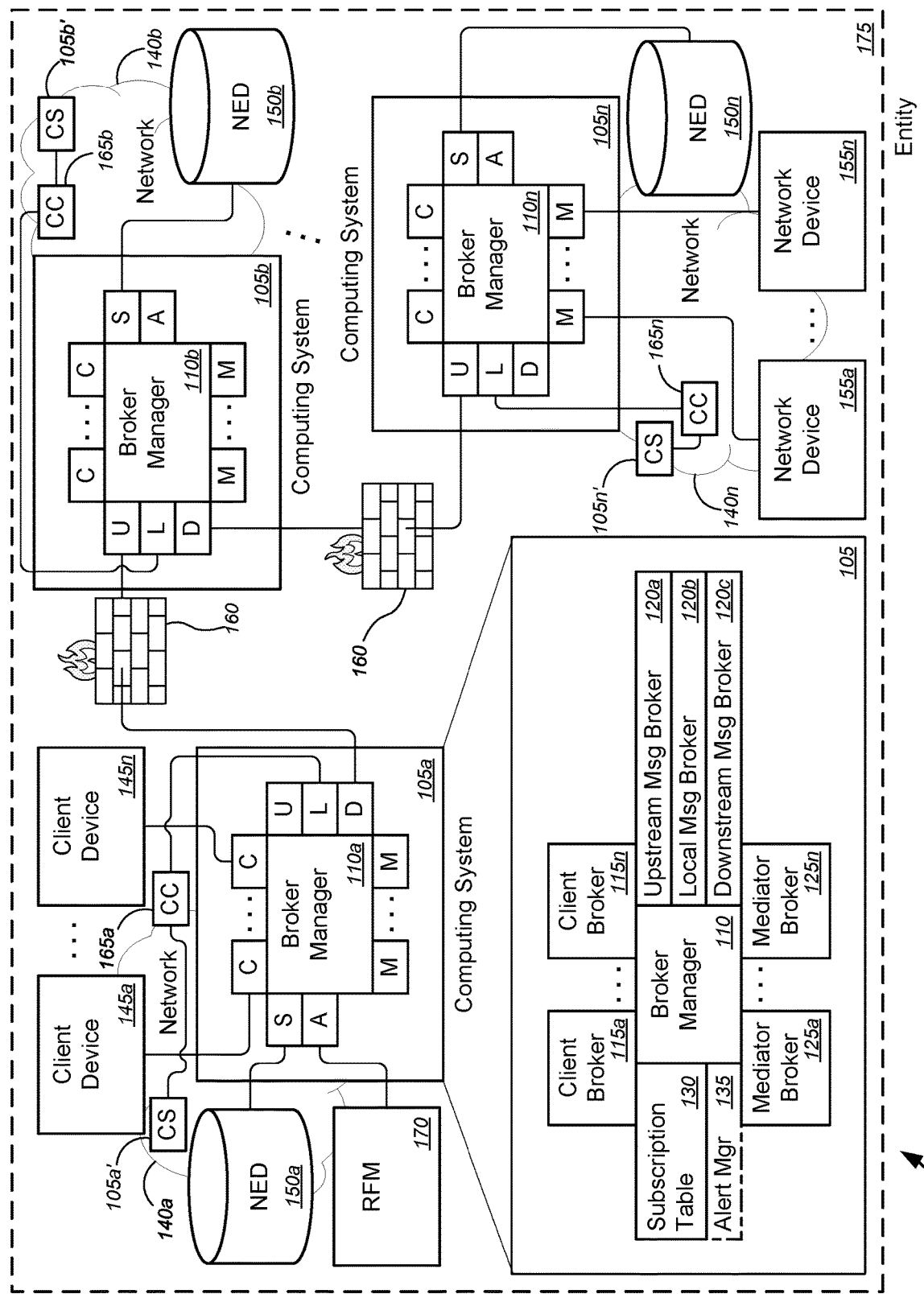
FIG. 1 is a schematic diagram illustrating a system for implementing name-based routing through networks, in accordance with various embodiments.

Various embodiments provide tools and techniques for implementing network routing, and, more particularly, to methods, systems, and apparatuses for implementing name-based routing through networks.

In various embodiments, a primary broker manager in each of a plurality of networks may receive a subscription request for a network device from a client device, where each of the client device or the network device may be locally accessible in the same network or disposed in an upstream or downstream network. For a locally accessible client device, the primary broker manager uses its client broker to communicate with the client device. For a locally accessible network device, the primary broker manager uses its mediator broker (and, in some cases, one or more intermediate devices) to communicate with the network device. Primary broker manager otherwise uses its local messaging broker to communicate with its network's local control channel, its upstream messaging broker to communicate with an upstream network's local control channel, and its downstream messaging broker to communicate with a downstream network's local control channel. Once subscription with the network device has been established, the client device is informed, and any commands for the network device from the client device and any responses from the network device to the client device may be routed over pub/sub channels created during the subscription process via the primary broker managers and their brokers using name-based routing (i.e., based on name of the network device, the network in which it is located, and connection information, etc.), without routing based on IP address of the network device. In some embodiments, alerts based on failures in connecting with the network device or connections to the network device (in some cases, with communicating with brokers, etc.) may be sent by the primary broker managers, and in some cases to fault management systems (e.g., real-time fault management system ("RFM"), or the like).

Name-based routing as described herein may enable one or more of the following features or characteristics (or otherwise provides the following functionalities): (a) provides virtual direct connection between a client and a device in a different network, which is separated from the client network by firewall, or the like; (b) can read the device from anywhere in the network(s); (c) acts like a "layer 4 extension cord"; (d) can pass through firewalls without having to open up ports and firewalls (thereby providing secure routing without requiring changes to the firewalls and ports for each routing instance); (e) can route by network and name rather than by IP address (which is limited in number, resulting in potential IP conflicts, or the like; compared with name-based routing that may utilize different naming conventions across networks and may likely use geographical identifiers in their names, or the like).

These and other aspects of the name-based routing through networks are described in greater detail with respect to the figures.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

In an aspect, a method may comprise receiving, using a first broker manager that is disposed within a first network among a plurality of networks and from a first client device, a request to establish a connection with a first network device over at least one network among the plurality of networks; and determining, using the first broker manager, whether the first network device is listed within a stored list together with a connection path at least between the first broker manager and the first network device over the at least one network. The method may further comprise, based on a determination that the first network device is listed within the stored list together with a first connection path at least between the first broker manager and the first network device over the at least one network, and based on a determination that the first network device is not locally accessible by the first broker manager, performing the following: sending or relaying, using the first broker manager, a message to the first client device indicating at least one of that a connection with the first network device has been established or that the first network device is ready to receive commands; and in response to receiving one or more commands for the first network device from the first client device, routing, using the first broker manager, the one or more commands via at least one of a local messaging broker or a downstream messaging broker that is managed by the first broker manager, based at least in part on the first connection path, without routing based on Internet Protocol ("IP") address of the first network device, the first connection path comprising a name of the first network device and an identifier ("ID") of a second network within which the first network device is located.

In some embodiments, the first client device may be disposed within the first network. In some cases, receiving the request to establish the connection with the first network device from the first client device may comprise receiving, using the first broker manager and from the first client device, the request via a client broker. In some instances, the local messaging broker may communicatively couple with a control channel associated with the first network. In some cases, the downstream messaging broker may communicatively couple with a control channel associated with one of the second network or an intermediate network among one or more intermediate networks between the first network and the second network. In some instances, the ID of the second network comprises at least one of a name, an alphanumeric ID, a numeric ID, or a unique ID of the second network, and/or the like. In some cases, each of the control channel associated with the first network, the control channel associated with the second network, and the control channel associated with the intermediate network may be clustered across multiple servers in its respective network.

According to some embodiments, the method may further comprise, based on a determination that the first network device is listed within the stored list together with a second connection path between the first broker manager and the first network device over the first network, and based on a determination that the first network device is locally accessible by the first broker manager, performing the following: sending or relaying, using the first broker manager, a message to the first client device indicating at least one of that a connection with the first network device has been established or that the first network device is ready to receive commands; and, in response to receiving the one or more commands for the first network device from the first client device, routing, using the first broker manager, the one or more commands via the client broker and via a mediator broker over the second connection path, without routing based on IP address of the first network device, the second connection path comprising a name of the first network device and an ID of the first network, the mediator broker being managed by the first broker manager.

In some instances, the mediator broker may comprise at least one of one or more serial line management ("SLM") mediator brokers, one or more transmission control protocol ("TCP") mediator brokers, one or more hypertext transfer protocol ("HTTP") mediator brokers, one or more secure shell protocol ("SSH") mediator brokers, or one or more simple network management protocol ("SNMP") mediator brokers, and/or the like. In some cases, each of at least one SLM mediator broker among the one or more SLM mediator brokers may be configured to mediate multiple connections to multiple client devices regardless of whether the first network device to which it is communicatively coupled is only capable of single client-only connection. In some instances, one or more of the client broker, the local messaging broker, the downstream messaging broker, or the mediator broker that are managed by the first broker manager may be modular. In some cases, the client broker may be configured to be interchangeable with other client brokers, each messaging broker may be configured to be interchangeable with other messaging brokers, and the mediator broker may be configured to be interchangeable with other mediator brokers. In some instances, the first broker manager may be communicatively coupled to and may manage at least one of one or more client brokers, one or more messaging brokers, or one or more mediator brokers, and/or the like. In some cases, each client broker may comprise one of a single-port client broker that communicatively couples with a single client device or a multi-port client broker that communicatively couples with each of a plurality of client devices.

In some embodiments, the method may further comprise, based on a determination either that the first network device is not listed within the stored list or that the first network device is listed within the stored list but without including a connection path between the first broker manager and the first network device, performing the following: forwarding, using the first broker manager, the request via at least one of the local messaging broker or the downstream messaging broker; after receiving a message from at least one other broker manager that is disposed within the plurality of networks indicating at least one of that a third connection path exists between the first broker manager and the first network device or that the first network device has been found, sending, using the first broker manager, a message to the first client device indicating at least one of that a connection with the first network device has been established or that the first network device is ready to receive commands, or the like, wherein the stored list may be updated with the third connection path in association with the first network device by either the first broker manager or one of the at least one other broker manager; and, in response to receiving the one or more commands for the first network device from the first client device, routing, using the first broker manager, the one or more commands via the client broker and via the at least one of the local messaging broker or the downstream messaging broker over the third connection path, without routing based on IP address of the first network device, the third connection path comprising a name of the first network device and an ID of a third network within which the first network device is located.

In some instances, the stored list may comprise a subscription table associated with the first broker manager. In some cases, forwarding the request may comprise polling, using the first broker manager, at least one of the local messaging broker or the downstream messaging broker to determine whether a subscription for the first network device already exists. In some instances, the method may further comprise dynamically identifying and creating, using the first broker manager, subscriptions based at least in part on receiving one or more subscription acknowledgement ("sub ack") messages from one or more intermediate broker managers between the first broker manager and the first network device in one or more of the first network, the third network, or an intermediate network among at least one intermediate network between the first network and the third network; and autonomously filling, using the first broker manager, one or more subscription fields in the subscription table based on the identified and created subscriptions.

In some cases, the first client device may be disposed within a fourth network among the plurality of networks. In some instances, receiving the request to establish the connection with the first network device from the first client device may comprise receiving, using the first broker manager and from the first client device, the request via a second broker manager that is locally coupled with the first client device via its client broker and via an upstream messaging broker that is communicatively coupled with a control channel associated with one of the fourth network or an intermediate network among one or more intermediate networks between the first network and the fourth network, the upstream messaging broker being managed by the first broker manager. In some cases, sending or relaying the message to the first client device may comprise relaying, using the first broker manager, the message to the first client device via the upstream messaging broker and via the second broker manager. In some instances, routing the one or more commands may comprise routing, using the first broker manager, the one or more commands via at least one of the upstream messaging broker, the local messaging broker, or the downstream messaging broker, based at least in part on the first connection path, without routing based on IP address of the first network device.

According to some embodiments, the first connection path may further comprise one or more communications channels between the first broker manager and the first network device, the one or more communications channels being joined by one or more intermediate broker managers between the first broker manager and the first network device. In some cases, the stored list may be maintained and updated within a network element database ("NED"). In some instances, the plurality of networks may be separated from each other by firewalls. Merely by way of example, in some cases, the first network device may comprise one of a network switch, an intermediary device, a multiservice provisioning platform, a gateway device, a network node, a router, a network security or firewall appliance, a telephone electronic switching system, an optical network switch and routing platform, a wavelength division multiplexing ("WDM")—based optical transport network system, a network transmission system, a server, or a user device, and/or the like.

In some embodiments, the stored list may comprise a subscription table associated with the first broker manager. In some instances, receiving the request to establish the connection with the first network device from the first client device may comprise receiving, using the first broker manager and from the first client device, a subscription request for subscribing to the first network device, the subscription request comprising subscription data associated with the first network device. In some cases, the message indicating at least one of that a connection with the first network device has been established or that the first network device is ready to receive commands may comprise at least one of a subscription acknowledgement ("sub ack") message, a message indicating that one or more publication/subscription ("pub/sub") channels have been created for the first network device in at least the first network and the second network, or a message indicating that one or more intermediate broker managers between the first broker manager and the first network device have joined the one or more pub/sub channels, and/or the like. In some instances, the method may further comprise adding, using the first broker manager, the subscription data to the subscription table. In some cases, routing the one or more commands may comprise routing the one or more commands based at least in part on subscription data contained in the subscription table.

In another aspect, a system may comprise a computing system that is disposed within a first network among a plurality of networks. The computing system may comprise a first broker manager, at least one first processor, and a first non-transitory computer readable medium communicatively coupled to the at least one first processor. The first non-transitory computer readable medium may have stored thereon computer software comprising a first set of instructions that, when executed by the at least one first processor, causes the first broker manager to: receive, from a first client device, a request to establish a connection with a first network device over at least one network among the plurality of networks; determine whether the first network device is listed within a stored list together with a connection path at least between the first broker manager and the first network device over the at least one network; and, based on a determination that the first network device is listed within the stored list together with a first connection path at least between the first broker manager and the first network device over the at least one network, and based on a determination that the first network device is not locally accessible by the first broker manager, perform the following: sending or relaying a message to the first client device indicating at least one of that a connection with the first network device has been established or that the first network device is ready to receive commands; and in response to receiving one or more commands for the first network device from the first client device, routing the one or more commands via at least one of a local messaging broker or a downstream messaging broker that is managed by the first broker manager, based at least in part on the first connection path, without routing based on Internet Protocol ("IP") address of the first network device, the first connection path comprising a name of the first network device and an identifier ("ID") of a second network within which the first network device is located.

In yet another aspect, a method may comprise receiving, using a first broker manager that is disposed within a first network among a plurality of networks and from the first client device, a subscription request for subscribing to the first network device; determining, using the first broker manager, whether the first network device is listed within a subscription table; based on a determination that the first network device is listed within the subscription table, and based on a determination that the first network device is not locally accessible by the first broker manager, performing the following: sending or relaying, using the first broker manager, a message to the first client device indicating at least one of a subscription acknowledgement ("sub ack") message, a message indicating that one or more publication/subscription ("pub/sub") channels have been created for the first network device in at least the first network and the second network, or a message indicating that one or more intermediate broker managers between the first broker manager and the first network device have joined the one or more pub/sub channels; and in response to receiving one or more commands for the first network device from the first client device, routing, using the first broker manager, the one or more commands via at least one of an upstream messaging broker, a local messaging broker, or a downstream messaging broker that is managed by the first broker manager, based at least in part on first subscription data associated with the first network device that is contained in the subscription table, without routing based on Internet Protocol ("IP") address of the first network device, the first subscription data comprising a name of the first network device and an identifier ("ID") of a second network within which the first network device is located; and, based on a determination that the first network device is listed within the subscription table, and based on a determination that the first network device is locally accessible by the first broker manager, perform the following: sending or relaying, using the first broker manager, a message to the first client device indicating at least one of that a connection with the first network device has been established or that the first network device is ready to receive commands; and in response to receiving the one or more commands for the first network device from the first client device, routing, using the first broker manager, the one or more commands via the client broker and via a mediator broker based at least in part on second subscription data associated with the first network device that is contained in the subscription table, without routing based on IP address of the first network device, the second subscription data comprising the name of the first network device and an ID of the first network, the mediator broker being managed by the first broker manager.

In some embodiments, receiving the subscription request may comprise receiving, using the first broker manager and from the first client device, the subscription request via a client broker. In some instances, the local messaging broker may communicatively couple with a control channel associated with the first network. In some cases, the downstream messaging broker may communicatively couple with a control channel associated with one of the second network or an intermediate network among one or more intermediate networks between the first network and the second network. In some instances, the upstream messaging broker may communicatively couple with a control channel associated with one of the fourth network or an intermediate network among one or more intermediate networks between the first network and the fourth network, in the case that the first network is disposed between the fourth network and the second network. In some cases, the ID of the second network may comprise at least one of a name, an alphanumeric ID, a numeric ID, or a unique ID, and/or the like, of the second network.

According to some embodiments, the method may further comprise, based on a determination that the first network device is not listed within the subscription table, performing the following: polling, using the first broker manager, at least one of the upstream messaging broker, the local messaging broker, or the downstream messaging broker to determine whether a subscription for the first network device already exists; dynamically identifying and creating, using the first broker manager, subscriptions based at least in part on receiving one or more subscription acknowledgement ("sub ack") messages from one or more intermediate broker managers between the first broker manager and the first network device in one or more of the first network, a third network within which the first network device is determined to be located, or an intermediate network among at least one intermediate network between the first network and the third network; autonomously filling, using the first broker manager, one or more subscription fields in the subscription table based on the identified and created subscriptions; sending or relaying, using the first broker manager, a message to the first client device indicating at least one of a sub ack message, a message indicating that one or more publication/subscription ("pub/sub") channels have been created for the first network device in at least the first network and the third network, or a message indicating that one or more intermediate broker managers between the first broker manager and the first network device have joined the one or more pub/sub channels; and in response to receiving one or more commands for the first network device from the first client device, routing, using the first broker manager, the one or more commands via at least one of the upstream messaging broker, the local messaging broker, or the downstream messaging broker, based at least in part on third subscription data associated with the first network device that is contained in the subscription table, without routing based on IP address of the first network device, the third subscription data comprising a name of the first network device and an ID of the third network within which the first network device is located.

In an aspect, a system may comprise a first plurality of broker managers disposed within a first network among a plurality of networks, a second plurality of broker managers disposed within a second network among the plurality of networks, and a first network device among a plurality of network devices. The first plurality of broker managers may comprise a first primary broker manager and at least one first secondary broker manager, the first primary broker being elected by the first plurality of broker managers to be a primary publisher in the first network, the at least one first secondary broker manager each being configured to be a secondary publisher that is on hot standby in the first network, and the plurality of networks being separated from each other by firewalls. The second plurality of broker managers may comprise a second primary broker manager and at least one second secondary broker manager, the second primary broker manager being elected by the second plurality of broker managers to be a primary publisher in the second network, and the at least one second secondary broker manager each being configured to be a secondary publisher that is on hot standby in the second network. The first network device may be disposed in the second network.

In some cases, in response to receiving a subscription request from a first client device for subscribing to the first network device, each broker manager among the first plurality of broker managers and among the second plurality of broker managers may be configured to perform at least one of: adding subscription data that is associated with the first network device and that is contained in the subscription request to its respective subscription table, the subscription data comprising a name of the first network device and an identifier ("ID") of a second network within which the first network device is located; based on a determination that the first network device is not locally accessible, forwarding the subscription request to at least one of its respective local control channel via a local messaging broker that it manages or a downstream local control channel via a downstream messaging broker that it manages if elected as a primary publisher in its respective network, and ignoring the subscription request if set as a secondary publisher in its respective network; or based on a determination that the first network device is locally accessible, creating one or more publication/subscription ("pub/sub") channels in its respective local control channel, and sending a subscription acknowledgement ("sub ack") message via at least one of an upstream messaging broker that it manages or the local messaging broker that it manages; and/or the like.

According to some embodiments, in response to receiving the subscription request from a first client device for subscribing to the first network device, each broker manager among the first plurality of broker managers and among the second plurality of broker managers may be further configured to perform at least one of: in response to receiving the sub ack message from another broker manager, joining the one or more pub/sub channels, forwarding the sub ack message to a local control channel in an upstream network if elected as a primary publisher in its respective network, and ignoring the sub ack message if set as a secondary publisher in its respective network; or if the first client device is locally accessible to it, sending confirmation of subscription to the first client device via a client broker that it manages, and receiving and routing one or more commands for the first network device from the first client device via the client broker and via at least one of the local messaging broker, a downstream messaging broker, or a mediator broker that it manages, based at least in part on the subscription data, without routing based on Internet Protocol ("IP") address of the first network device; and/or the like.

In some embodiments, each broker manager receiving the subscription request may comprise each broker manager receiving the subscription request via at least one of a client broker, the upstream messaging broker, the local messaging broker, or the downstream messaging broker, and/or the like, that it manages. In some cases, the local messaging broker for each broker manager may communicatively couple with a control channel associated with its respective network. In some instances, the downstream messaging broker for each broker manager may communicatively couple with a control channel associated with one of its respective network or a downstream intermediate network among one or more downstream intermediate networks between its respective network and the second network. In some cases, the upstream messaging broker for each broker manager may communicatively couple with a control channel associated with one of a fourth network within which the client device is disposed if not disposed in the first network or an upstream intermediate network among one or more upstream intermediate networks between the first network and the fourth network, in the case that the first network is disposed between the fourth network and the second network. In some instances, the ID of the second network may comprise at least one of a name, an alphanumeric ID, a numeric ID, or a unique ID, and/or the like, of the second network.

Merely by way of example, in some cases, the mediator broker may comprise at least one of one or more serial line management ("SLM") mediator brokers, one or more transmission control protocol ("TCP") mediator brokers, one or more hypertext transfer protocol ("HTTP") mediator brokers, one or more secure shell protocol ("SSH") mediator brokers, or one or more simple network management protocol ("SNMP") mediator brokers, and/or the like. In some instances, each of at least one SLM mediator broker among the one or more SLM mediator brokers may be configured to mediate multiple connections to multiple client devices regardless of whether the first network device to which it is communicatively coupled is only capable of single client-only connection.

In some cases, one or more of the client broker, the upstream messaging broker, the local messaging broker, the downstream messaging broker, or the mediator broker may be modular. In some instances, the client broker may be configured to be interchangeable with other client brokers, each messaging broker may be configured to be interchangeable with other messaging brokers, and the mediator broker may be configured to be interchangeable with other mediator brokers. In some cases, each broker manager may be communicatively coupled to and may manage at least one of one or more client brokers, one or more messaging brokers, or one or more mediator brokers, and/or the like. In some instances, each client broker may comprise one of a single-port client broker that communicatively couples with a single client device or a multi-port client broker that communicatively couples with each of a plurality of client devices.

In some instances, each subscription table associated a corresponding broker manager among the first plurality of broker managers and among the second plurality of broker managers may be maintained and updated within a network element database ("NED"). Merely by way of example, in some cases, the first network device may comprise one of a network switch, an intermediary device, a multiservice provisioning platform, a gateway device, a network node, a router, a network security or firewall appliance, a telephone electronic switching system, an optical network switch and routing platform, a wavelength division multiplexing ("WDM")—based optical transport network system, a network transmission system, a server, or a user device, and/or the like.

According to some embodiments, the system may further comprise a first local control channel disposed in the first network; and a second local control channel disposed in the second network. In some instances, each of the first local control channel and the second local control channel may be clustered across multiple servers in its respective network. In some cases, the second primary broker manager may communicatively couple with the first network device via its mediator broker. In some instances, the first client device may be disposed within the first network. In some cases, the first primary broker manager may communicatively couple with the first client device via its client broker. In some instances, the first primary broker manager may communicatively couple with the first local control channel via its local messaging broker. In some instances, the first primary broker manager may communicatively couple with the second local control channel via its downstream messaging broker.

In some embodiments, the system may further comprise a third plurality of broker managers disposed within a third network among the plurality of networks, and a third local control channel disposed in the third network. The third plurality of broker managers may comprise a third primary broker manager and at least one third secondary broker manager, the third primary broker manager being elected by the third plurality of broker managers to be a primary publisher in the third network, the at least one third secondary broker manager each being configured to be a secondary publisher that is on hot standby in the third network, and the third network being a downstream intermediate network among one or more downstream intermediate networks between the first network and the second network. In some cases, the first primary broker manager may communicatively couple with the second local control channel, via the third local control channel and via its downstream messaging broker.

According to some embodiments, the system may further comprise a fourth plurality of broker managers disposed within a fourth network among the plurality of networks, and a fourth local control channel disposed in the fourth network. The fourth plurality of broker managers may comprise a fourth primary broker manager and at least one fourth secondary broker manager, the fourth primary broker manager being elected by the fourth plurality of broker managers to be a primary publisher in the fourth network, and the at least one fourth secondary broker manager each being configured to be a secondary publisher that is on hot standby in the fourth network. In some instances, the first client device may be disposed within the fourth network. In some cases, the first primary broker manager may communicatively couple with the first client device via the fourth local control channel, via the fourth primary broker manager, and via its upstream messaging broker. In some instances, the first primary broker manager may communicatively couple with the first local control channel via its local messaging broker. In some cases, the first primary broker manager may communicatively couple with the second local control channel via its downstream messaging broker.

In some embodiments, the system may further comprise a fifth plurality of broker managers disposed within a fifth network among the plurality of networks, and a fifth local control channel disposed in the fifth network. The fifth plurality of broker managers may comprise a fifth primary broker manager and at least one fifth secondary broker manager, the fifth primary broker manager being elected by the fifth plurality of broker managers to be a primary publisher in the fifth network, the at least one fifth secondary broker manager each being configured to be a secondary publisher that is on hot standby in the fifth network, and the fifth network being an upstream intermediate network among one or more upstream intermediate networks between the first network and the fourth network. In some instances, the first primary broker manager may communicatively couple with the fourth local control channel via the fifth local control channel and via its upstream messaging broker.

According to some embodiments, the system may further comprise, in response to receiving one or more commands for the first network device from the first client device, each broker manager among the first plurality of broker managers and among the second plurality of broker managers may be further configured to perform at least one of: based on a determination that the first network device is not locally accessible, routing the one or more commands to at least one of its respective local control channel via the local messaging broker that it manages or the downstream local control channel via the downstream messaging broker that it manages if elected as a primary publisher in its respective network, and ignoring the one or more commands if set as a secondary publisher in its respective network; or based on a determination that the first network device is locally accessible, routing the one or more commands to the first network device via its mediator broker. In some instances, routing the one or more commands may be based at least in part on subscription data associated with the first network device that is contained in the subscription table, without routing based on IP address of the first network device.

In some embodiments, in response to receiving a reply from the first network device for the first client device, each broker manager among the first plurality of broker managers and among the second plurality of broker managers may be further configured to perform at least one of: based on a determination that the first client device is not locally accessible, routing the reply to at least one of its respective local control channel via the local messaging broker that it manages or an upstream local control channel via the upstream messaging broker that it manages if elected as a primary publisher in its respective network, and ignoring the reply if set as a secondary publisher in its respective network; or based on a determination that the first client device is locally accessible, routing the reply to the first client device via its client broker; and/or the like.

According to some embodiments, after it initializes or powers on, each broker manager among the first plurality of broker managers and among the second plurality of broker managers may be further configured to perform at least one of: initializing one or more mediator brokers it is managing; initializing one or more client brokers it is managing; connecting to at least one of its respective local control channel via the local messaging broker that it manages, a downstream local control channel in a downstream network via the downstream messaging broker that it manages, or an upstream local control channel in an upstream network via the upstream messaging broker that it manages, and/or the like; sending a hello message over at least one of its respective local control channel, the downstream local control channel in the downstream network, or the upstream local control channel in the upstream network; or, in response to receiving a hello acknowledgement ("hello ack") message from each of one or more broker managers among the first plurality of broker managers and among the second plurality of broker managers, marking presence of each of the one or more broker managers; and/or the like.

Merely by way of example, in some cases, each broker manager among the first plurality of broker managers and among the second plurality of broker managers may comprise at least one of a virtual broker manager, a software-based ("SW") broker manager, or a broker manager software application ("app"), and/or the like.

In another aspect, a method may comprise, in response to receiving a subscription request from a first client device for subscribing to a first network device, a broker manager performing at least one of the following: adding subscription data that is associated with the first network device and that is contained in the subscription request to its respective subscription table, the subscription data comprising a name of the first network device and an identifier ("ID") of a second network within which the first network device is located; based on a determination that the first network device is not locally accessible, forwarding the subscription request to at least one of its respective local control channel via a local messaging broker that it manages or a downstream local control channel via a downstream messaging broker that it manages if elected as a primary publisher in its respective network, and ignoring the subscription request if set as a secondary publisher in its respective network, wherein the primary publisher in its respective network is elected by other broker managers in its respective network to perform publication/subscription ("pub/sub") functions used in name-based routing, wherein the secondary publisher is on hot standby in its respective network to take over pub/sub functions during failover events involving the primary publisher; or based on a determination that the first network device is locally accessible, creating one or more pub/sub channels in its respective local control channel, and sending a subscription acknowledgement ("sub ack") message via at least one of an upstream messaging broker that it manages or the local messaging broker that it manages, or the like. In some instances, the broker manager may be among a first plurality of broker managers that is disposed within a first network among a plurality of networks and among a second plurality of broker managers that is disposed within a second network among the plurality of networks. In some cases, the plurality of networks may be separated from each other by firewalls.

In some instances, in response to receiving the subscription request from the first client device for subscribing to the first network device, the broker manager may further perform at least one of the following: in response to receiving the sub ack message from another broker manager, joining the one or more pub/sub channels, forwarding the sub ack message to a local control channel in an upstream network if elected as a primary publisher in its respective network, and ignoring the sub ack message if set as a secondary publisher in its respective network; or if the first client device is locally accessible to it, sending confirmation of subscription to the first client device via a client broker that it manages, and receiving and routing one or more commands for the first network device from the first client device via the client broker and via at least one of the local messaging broker, a downstream messaging broker, or a mediator broker that it manages, based at least in part on the subscription data, without routing based on Internet Protocol ("IP") address of the first network device.

In some cases, receiving the subscription request may comprise the broker manager receiving the subscription request via at least one of a client broker, the upstream messaging broker, the local messaging broker, or the downstream messaging broker, and/or the like, that it manages. In some instances, the local messaging broker for each broker manager may communicatively couple with a control channel associated with its respective network. In some cases, the downstream messaging broker for each broker manager may communicatively couple with a control channel associated with one of its respective network or a downstream intermediate network among one or more downstream intermediate networks between its respective network and the second network. In some instances, the upstream messaging broker for each broker manager may communicatively couple with a control channel associated with one of a fourth network within which the client device is disposed if not disposed in the first network or an upstream intermediate network among one or more upstream intermediate networks between the first network and the fourth network, in the case that the first network is disposed between the fourth network and the second network. In some cases, the ID of the second network may comprise at least one of a name, an alphanumeric ID, a numeric ID, or a unique ID, and/or the like, of the second network. Merely by way of example, in some cases, the mediator broker may comprise at least one of one or more serial line management ("SLM") mediator brokers, one or more transmission control protocol ("TCP") mediator brokers, one or more hypertext transfer protocol ("HTTP") mediator brokers, one or more secure shell protocol ("SSH") mediator brokers, or one or more simple network management protocol ("SNMP") mediator brokers. and/or the like.

In yet another aspect, a system may comprise a first plurality of broker managers disposed within a first network among a plurality of networks, a second plurality of broker managers disposed within a second network among the plurality of networks, a first network device among a plurality of network devices that is disposed in the second network, and a computing system that is disposed within one of the plurality of networks. In some cases, the first plurality of broker managers may comprise a first primary broker manager and at least one first secondary broker manager, the first primary broker being elected by the first plurality of broker managers to be a primary publisher in the first network, the at least one first secondary broker manager each being configured to be a secondary publisher that is on hot standby in the first network, and the plurality of networks being separated from each other by firewalls. In some instances, the second plurality of broker managers may comprise a second primary broker manager and at least one second secondary broker manager, the second primary broker manager being elected by the second plurality of broker managers to be a primary publisher in the second network, and the at least one second secondary broker manager each being configured to be a secondary publisher that is on hot standby in the second network. In some cases, the computing system may comprise: a broker manager among the first plurality of broker managers and among the second plurality of broker managers; at least one first processor; and a first non-transitory computer readable medium communicatively coupled to the at least one first processor. The first non-transitory computer readable medium may have stored thereon computer software comprising a first set of instructions that, when executed by the at least one first processor, causes the broker manager to: in response to receiving a subscription request from a first client device for subscribing to the first network device, add subscription data that is associated with the first network device and that is contained in the subscription request to its respective subscription table, the subscription data comprising a name of the first network device and an identifier ("ID") of a second network within which the first network device is located; based on a determination that the first network device is not locally accessible, forward the subscription request to at least one of its respective local control channel via a local messaging broker that it manages or a downstream local control channel via a downstream messaging broker that it manages if elected as a primary publisher in its respective network, and ignore the subscription request if set as a secondary publisher in its respective network; or based on a determination that the first network device is locally accessible, create one or more publication/subscription ("pub/sub") channels in its respective local control channel, and send a subscription acknowledgement ("sub ack") message via at least one of an upstream messaging broker that it manages or the local messaging broker that it manages.

In an aspect, a method may comprise receiving, using a first broker manager that is disposed within a first network among a plurality of networks and from a first client device, a request to establish a connection with a first network device over at least one network among the plurality of networks. The method may further comprise, based on a determination that the first network device is listed within a stored list, determining, using the first broker manager, whether any alerts associated with the first network device have been received by an alert manager that is communicatively coupled with the first broker manager, and performing at least one of the following, without polling other broker managers regarding the status of the first network device and without attempting to connect to the first network device via one or more brokers that are managed by the first broker manager: based on a determination that an alert has been received that indicates that the first network device is offline, sending or relaying, using the first broker manager, a message to the first client device indicating that the first network device is offline; or based on a determination that an alert has been received that indicates that a connection to the first network device is currently lost, sending or relaying, using the first broker manager, a message to the first client device indicating that a connection to the first network device is currently lost.

In some embodiments, the first client device may be disposed within the first network. In some cases, receiving the request to establish the connection with the first network device from the first client device may comprise receiving, using the first broker manager and from the first client device, the request via a client broker. In some instances, the one or more brokers may comprise at least one of a local messaging broker or a downstream messaging broker, or the like. In some instances, the local messaging broker may communicatively couple with a control channel associated with the first network. In some cases, the downstream messaging broker may communicatively couple with a control channel associated with one of a second network within which the first network device is located or an intermediate network among one or more intermediate networks between the first network and the second network.

In some instances, each of the control channel associated with the first network, the control channel associated with the second network, and the control channel associated with the intermediate network may be clustered across multiple servers in its respective network. In some cases, the first network device may be determined to be locally accessible by the first broker manager when the first network device is not offline and when the connection to the first network devices is not currently lost. In some instances, the one or more brokers may further comprise a mediator broker. Merely by way of example, in some cases, the mediator broker may comprise at least one of one or more serial line management ("SLM") mediator brokers, one or more transmission control protocol ("TCP") mediator brokers, one or more hypertext transfer protocol ("HTTP") mediator brokers, one or more secure shell protocol ("SSH") mediator brokers, or one or more simple network management protocol ("SNMP") mediator brokers, and/or the like. In some instances, each of at least one SLM mediator broker among the one or more SLM mediator brokers may be configured to mediate multiple connections to multiple client devices regardless of whether the first network device to which it is communicatively coupled is only capable of single client-only connection.

In some cases, one or more of the client broker, the local messaging broker, the downstream messaging broker, or the mediator broker may be modular. In some instances, the client broker may be configured to be interchangeable with other client brokers, each messaging broker may be configured to be interchangeable with other messaging brokers, and the mediator broker may be configured to be interchangeable with other mediator brokers. In some cases, the first broker manager may be communicatively coupled to and may manage at least one of one or more client brokers, one or more messaging brokers, or one or more mediator brokers, and/or the like. In some instances, each client broker may comprise one of a single-port client broker that communicatively couples with a single client device or a multi-port client broker that communicatively couples with each of a plurality of client devices.

According to some embodiments, the method may further comprise, based on a determination that the first network device is not listed within the stored list, performing the following: forwarding, using the first broker manager, the request via at least one of the local messaging broker or the downstream messaging broker; after receiving a message from at least one other broker manager that is disposed within the plurality of networks indicating that the first network device is offline, updating, using the first broker manager, the stored list to indicate that the first network device is offline, and sending or relaying, using the first broker manager, a message to the first client device indicating that the first network device is offline; and after receiving a message from at least one other broker manager that is disposed within the plurality of networks indicating that a connection to the first network device is currently lost, updating, using the first broker manager, the stored list to indicate that a connection to the first network device is currently lost, and sending or relaying, using the first broker manager, a message to the first client device indicating that a connection to the first network device is currently lost.

In some instances, the stored list may comprise a subscription table associated with the first broker manager. In some cases, forwarding the request may comprise polling, using the first broker manager, at least one of the local messaging broker or the downstream messaging broker to determine whether a subscription for the first network device already exists. In some instances, the method may further comprise dynamically identifying and creating, using the first broker manager, subscriptions based at least in part on receiving one or more subscription acknowledgement ("sub ack") messages from one or more intermediate broker managers between the first broker manager and the first network device in one or more of the first network, the third network, or an intermediate network among at least one intermediate network between the first network and the third network, and/or the like. The method may also comprise autonomously filling, using the first broker manager, one or more subscription fields in the subscription table based on the identified and created subscriptions.

In some embodiments, the method may further comprise at least one of: issuing, using the alert manager, a trouble ticket for the first network device; sending, using the alert manager, a message to a technician to repair at least one of the first network device or the connection to the first network device; or sending, using the alert manager, an alert associated with the first network device to a fault management system; and/or the like.

According to some embodiments, the first client device may be disposed within a fourth network among the plurality of networks. In some cases, receiving the request to establish the connection with the first network device from the first client device may comprise receiving, using the first broker manager and from the first client device, the request via a second broker manager that is locally coupled with the first client device via its client broker and via an upstream messaging broker that is communicatively coupled with a control channel associated with one of the fourth network or an intermediate network among one or more intermediate networks between the first network and the fourth network, the upstream messaging broker being managed by the first broker manager. In some instances, sending or relaying the message to the first client device may comprise relaying, using the first broker manager, the message to the first client device via the upstream messaging broker and via the second broker manager. In some cases, relaying one of the message to the first client device indicating that the first network device is offline or the message to the first device indicating that a connection to the first network device is currently lost may comprise relaying the one of the message to the first client device indicating that the first network device is offline or the message to the first device indicating that a connection to the first network device is currently lost via the second broker manager and via the upstream messaging broker.

In some instances, the stored list may be maintained and updated within a network element database ("NED"). In some cases, the plurality of networks may be separated from each other by firewalls. Merely by way of example, in some cases, the first network device may comprise one of a network switch, an intermediary device, a multiservice provisioning platform, a gateway device, a network node, a router, a network security or firewall appliance, a telephone electronic switching system, an optical network switch and routing platform, a wavelength division multiplexing ("WDM") -based optical transport network system, a network transmission system, a server, or a user device, and/or the like. In some instances, the stored list may comprise a subscription table associated with the first broker manager. In some cases, receiving the request to establish the connection with the first network device from the first client device may comprise receiving, using the first broker manager and from the first client device, a subscription request for subscribing to the first network device.

In some embodiments, the method may further comprise updating, using the first broker manager, the subscription table based at least in part on received status information associated with at least one of the first network device or the connection to the first network device.

In another aspect, a system may comprise a computing system that is disposed within a first network among a plurality of networks. The computing system may comprise a first broker manager, at least one first processor, and a first non-transitory computer readable medium communicatively coupled to the at least one first processor. The first non-transitory computer readable medium may have stored thereon computer software comprising a first set of instructions that, when executed by the at least one first processor, causes the first broker manager to: receive, from a first client device, a request to establish a connection with a first network device over at least one network among the plurality of networks; based on a determination that the first network device is listed within a stored list, determine whether any alerts associated with the first network device have been received by an alert manager that is communicatively coupled with the first broker manager, and perform at least one of the following, without polling other broker managers regarding the status of the first network device and without attempting to connect to the first network device via one or more brokers that are managed by the first broker manager: based on a determination that an alert has been received that indicates that the first network device is offline, sending or relaying a message to the first client device indicating that the first network device is offline; or based on a determination that an alert has been received that indicates that a connection to the first network device is currently lost, sending or relaying a message to the first client device indicating that a connection to the first network device is currently lost.

In yet another aspect, a method may comprise receiving, using a first broker manager that is disposed within a first network among a plurality of networks and from the first client device, a subscription request for subscribing to the first network device; and determining, using the first broker manager, whether the first network device is listed within a subscription table. The method may further comprise, based on a determination that the first network device is listed within the subscription table, determining, using the first broker manager, whether any alerts associated with the first network device have been received by an alert manager that is communicatively coupled with the first broker manager, and performing at least one of the following, without polling other broker managers regarding the status of the first network device and without attempting to connect to the first network device via one or more brokers that are managed by the first broker manager: based on a determination that an alert has been received that indicates that the first network device is offline, sending or relaying, using the first broker manager, a message to the first client device indicating that the first network device is offline; based on a determination that an alert has been received that indicates that a connection to the first network device is currently lost, sending or relaying, using the first broker manager, a message to the first client device indicating that a connection to the first network device is currently lost; or based on a determination that the first network device is locally accessible by the first broker manager when the first network device is not offline and when the connection to the first network devices is not currently lost, sending at least one of the message to the first client device indicating that the first network device is offline or the message to the first device indicating that a connection to the first network device is currently lost, without communicatively coupling with a mediator broker between the first broker manager and the first network device, the mediator broker being managed by the first broker manager; and/or the like.

In some embodiments, receiving the subscription request may comprise receiving, using the first broker manager and from the first client device, the subscription request via a client broker. In some cases, the one or more brokers may comprise at least one of an upstream messaging broker, a local messaging broker, or a downstream messaging broker, and/or the like. In some instances, the local messaging broker may communicatively couple with a control channel associated with the first network. In some cases, the downstream messaging broker may communicatively couple with a control channel associated with one of a second network within which the first network device is located or an intermediate network among one or more intermediate networks between the first network and the second network. In some instances, the upstream messaging broker may communicatively couple with a control channel associated with one of the fourth network or an intermediate network among one or more intermediate networks between the first network and the fourth network, in the case that the first network is disposed between the fourth network and the second network. In some cases, the ID of the second network may comprise at least one of a name, an alphanumeric ID, a numeric ID, or a unique ID, and/or the like, of the second network.

According to some embodiments, the method may further comprise, based on a determination either that the first network device is not listed within the subscription table, performing the following: polling, using the first broker manager, at least one of the upstream messaging broker, the local messaging broker, or the downstream messaging broker to determine whether a subscription for the first network device already exists; dynamically identifying and creating, using the first broker manager, subscriptions based at least in part on receiving one or more subscription acknowledgement ("sub ack") messages from one or more intermediate broker managers between the first broker manager and the first network device in one or more of the first network, a third network within which the first network device is determined to be located, or an intermediate network among at least one intermediate network between the first network and the third network; autonomously filling, using the first broker manager, one or more subscription fields in the subscription table based on the identified and created subscriptions; after receiving a message from at least one other broker manager that is disposed within the plurality of networks indicating that the first network device is offline, updating, using the first broker manager, the subscription table to indicate that the first network device is offline, and sending or relaying, using the first broker manager, a message to the first client device indicating that the first network device is offline; and after receiving a message from at least one other broker manager that is disposed within the plurality of networks indicating that a connection to the first network device is currently lost, updating, using the first broker manager, the subscription table to indicate that a connection to the first network device is currently lost, and sending or relaying, using the first broker manager, a message to the first client device indicating that a connection to the first network device is currently lost.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-5 illustrate some of the features of the method, system, and apparatus for implementing network routing, and, more particularly, to methods, systems, and apparatuses for implementing name-based routing through networks, as referred to above. The methods, systems, and apparatuses illustrated by FIGS. 1-5 refer to examples of different embodiments that include various components and steps, which can be considered alternatives or which can be used in conjunction with one another in the various embodiments. The description of the illustrated methods, systems, and apparatuses shown in FIGS. 1-5 is provided for purposes of illustration and should not be considered to limit the scope of the different embodiments.

With reference to the figures, FIG. 1 is a schematic diagram illustrating a system 100 for implementing name-based routing through networks, in accordance with various embodiments.

In the non-limiting embodiment of FIG. 1, system 100 may comprise one or more computing systems ("CS") 105a-105n and 105a'-105n' (collectively, "computing systems 105 or 105" or "computing systems" or "CS" or the like) that are disposed across a plurality of networks 140a-140n (collectively, "networks 140" or the like), which may be separated from each other by firewalls 160, or the like. Each computing system 105 or 105' may comprise a broker controller or broker manager 110 (that is, computing system 105a comprises broker manager 110a, computing system 105b comprises broker manager 110b, computing system 105n comprises broker manager 110n, computing system 105a' comprises broker manager 110a', computing system 105b' comprises broker manager 110b', computing system 105n' comprises broker manager 110n', and so on). As shown in FIG. 1, each broker manager 110 may include, without limitation, at least one of one or more client broker 115a-115n (collectively, "client brokers 115" or the like), one or more messaging brokers 120 (including, but not limited to, at least one of an upstream messaging broker 120a, a local messaging broker 120b, or a downstream messaging broker 120c, and/or the like), one or more mediator brokers 125a-125n (collectively, "mediator brokers 125" or the like), a subscription table 130, or an alert manager 135 (optional), and/or the like. Merely by way of example, in some cases, each broker manager 110 may include, but is not limited to, at least one of a virtual broker manager, a software-based ("SW") broker manager, or a broker manager software application ("app"), and/or the like. In some instances, each of the brokers 115-125, as well as the subscription table 130 and alert manager 135, may be implemented as virtual, SW, and/or app components, or the like.

System 100 may further comprise at least one of one or more client devices 145a-145n (collectively, "client devices 145" or the like), one or more network element databases ("NEDs") 150a-150n (collectively, "NEDs 150" or the like; in some cases, with each NED corresponding to a network (e.g., NED 150a associated with and disposed in network 140a, NED 150b associated with and disposed in network 140b, NED 150n associated with and disposed in network 140n, and so on)), one or more network devices 155a-155n (collectively, "network devices 155" or the like; although shown in FIG. 1 to be disposed only in network 140n, network devices 155 may be disposed throughout networks 140a-140n, or the like), firewalls 160 at edges of networks 140 and/or between networks 140, one or more control channels ("CC") 165a-165n (collectively, "control channels 165" or "CC" or the like; in some cases, with each CC corresponding to a network (e.g., CC 165a associated with and disposed in network 140a, CC 165b associated with and disposed in network 140b, CC 165n associated with and disposed in network 140n, and so on)), a fault management system 170 (e.g., real-time fault management system ("RFM") 170, or the like), and/or the like. According to some embodiments, networks 140a-140n and the components described above that may be disposed in networks 140a-140n may be associated with, owned by, and/or operated by (or on behalf of) an entity 175, including, but not limited to, at least one of an enterprise company, a business entity, a corporate entity, a private entity, a public entity, a healthcare services entity, a governmental entity, or a service provider, and/or the like.

According to some embodiments, network(s) 140a-140n may each include, without limitation, one of a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network(s) 140a-140n may include an access network of the service provider (e.g., an Internet service provider ("ISP")). In another embodiment, the network(s) 140a-140n may include a core network of the service provider and/or the Internet.

In some embodiments, disposed within each network 140a-140n may be a plurality of computing systems 105, 105', and so on, and their corresponding broker managers 110, 110', and so on. For example, as shown in FIG. 1, at least computing systems 105a and 105a' may be disposed in first network 140a (although not shown, computing system 105a", 105a''', and so on, may also be disposed in the first network 140a), with each comprising a broker manager 110a, 110a', and so on. In some instances, broker manager 110a may be a first primary broker manager, which may be elected by the plurality of broker managers in the first network 140a to be primary publisher in the first network 140a, while broker manager 110a' may be a first secondary broker manager among two or more first secondary broker managers (e.g., 110a', 110a", 110a''', etc.) that are each configured to be a secondary publisher that is on hot standby in the first network 140a. Similarly, broker manager 110b may be the second primary broker manager that is elected by the plurality of broker managers in the second network 140b to be primary publisher in the second network 140a, while broker manager 110b' may be a second secondary broker manager (among two or more such broker managers) that are each configured to be a secondary publisher that is on hot standby in the second network 140b. And so on. Being on hot standby, the secondary publisher takes over operations for the primary publisher in its respective network and provides invisible and/or seamless failover, as well as redundancy, in the event that the primary publisher in said network goes offline, non-operational, or otherwise becomes not fully functional, or the like.

In some cases, each client broker 115a-115n may include, but is not limited to, one of a single-port client broker that communicatively couples with a single client device 145 or a multi-port client broker that communicatively couples with each of a plurality of client devices 145. In some instances, the one or more client devices 145a-145n may each include, but is limited to, one of a desktop computer, a laptop computer, a tablet computer, a smart phone, a mobile phone, a probe, a NOC computing system or console, or any suitable device capable of communicating with broker controller 110 via client broker 115, or the like) via a web-based portal, an application programming interface ("API"), a server, a software application ("app"), or any other suitable communications interface or protocol, or the like, over network(s) 140. In some cases, the local messaging broker 120b for each broker manager 110 may communicatively couple with a control channel 165 associated with its respective network 140. In some instances, the downstream messaging broker 120c for each broker manager 110 may communicatively couple with a control channel 165 associated with one of its respective network 140 or a downstream intermediate network among one or more downstream intermediate networks between its respective network and the network within which the network device is disposed or located (in this case, network 140n, or the like). In some cases, the upstream messaging broker 120a for each broker manager 110 may communicatively couple with a control channel 165 associated with one of a network within which the client device is disposed if not disposed in its respective network or an upstream intermediate network among one or more upstream intermediate networks between its respective network and the network within which the client device is disposed or located (in this case, network 140a, or the like), in the case that its respective network is disposed between the network 140a and the network 140n.

Merely by way of example, in some cases, the one or more mediator brokers 125 may each include, without limitation, at least one of one or more serial line management ("SLM") mediator brokers, one or more transmission control protocol ("TCP") mediator brokers, one or more hypertext transfer protocol ("HTTP") mediator brokers, one or more secure shell protocol ("SSH") mediator brokers, or one or more simple network management protocol ("SNMP") mediator brokers, and/or the like. In some instances, each of at least one SLM mediator broker among the one or more SLM mediator brokers may be configured to mediate multiple connections to multiple client devices regardless of whether the network device 155 to which it is communicatively coupled is only capable of single client-only connection.

In some instances, at least one of the one or more client brokers 115a-115n, the upstream messaging broker 120a, the local messaging broker 120b, the downstream messaging broker 120c, or the one or more mediator brokers 125a-125n, and/or the like, may be modular. In some instances, each client broker 115 may be configured to be interchangeable with other client brokers 115, each messaging broker 120 may be configured to be interchangeable with other messaging brokers 120, and each mediator broker 125 may be configured to be interchangeable with other mediator brokers 125. In some cases, each broker manager 110 may be communicatively coupled to/with and may manage at least one of one or more client brokers 115a-115n, one or more messaging brokers 120a-120c, or one or more mediator brokers 125a-125n, and/or the like.

In some cases, each subscription table 130 associated a corresponding broker manager 110 may be maintained and updated within a network element database (e.g., NED 150, or the like). In some instances, the alert manager 135 may be configured to perform at least one of: receiving alerts or messages indicating that one or more network devices 155 are offline; receiving alerts or messages indicating that a connection to each of one or more network devices 155 is currently lost (or down); issuing a trouble ticket for the one or more network devices 155; sending a message to a technician to repair at least one of the one or more network devices 155 or the connection to the one or more network devices 155; or sending an alert associated with each of the one or more network devices 155 to a fault management system (i.e., feeding alert data into fault management system 170 (e.g., RFM 170, or the like), or the like); and/or the like. RFM 170 is described in greater detail in U.S. patent application Ser. No. 17/987,316 (the "'316 Application"), filed Nov. 15, 2022, by Steve Toms et al., entitled, "Real-Time Fault Management (RFM)," which claims priority to U.S. patent application Ser. No. 63/402,812 (the "'812 Application"), filed Aug. 31, 2022, by Steve Toms et al., entitled, "Real-Time Fault Management (RFM)," the disclosure of each of which is incorporated herein by reference in its entirety for all purposes.

Merely by way of example, in some cases, the one or more network devices 155a-155n may each include, but is not limited to, one of a network switch, an intermediary device, a multiservice provisioning platform, a gateway device, a network node, a router, a network security or firewall appliance, a telephone electronic switching system, an optical network switch and routing platform, a wavelength division multiplexing ("WDM")-based optical transport network system, a network transmission system, a server, or a user device, and/or the like. In some instances, each control channel or CC 165a-165n may be clustered across multiple servers in its respective network 140, and each CC 165 may serve as a message bus for its respective network 140. In some cases, each CC 165 may utilize a stream-processing platform, message service, and/or message broker (and their corresponding protocols or the like) including, but not limited to, Apache Kafka®, Tibco®, representational state transfer ("REST"), Apache ActiveMQ®, Java® message service ("JMS"), RabbitMQ®, or HornetQ®, and/or the like.

In some embodiments, in response to receiving a subscription request from a first client device for subscribing to a first network device, each broker manager 110 may be configured to perform at least one of: adding subscription data that is associated with the first network device and that is contained in the subscription request to its respective subscription table 130, the subscription data comprising a name of the first network device and an identifier ("ID") of a network within which the first network device (e.g., network device 155a, or the like) is located (in this case, network 140n, or the like); based on a determination that the first network device is not locally accessible (i.e., accessible via other broker managers, or the like), forwarding the subscription request to at least one of its respective local control channel (e.g., CC 165a or 165b, or the like) via a local messaging broker 120b that it manages or a downstream local control channel (e.g., CC 165b-165n, or the like) via a downstream messaging broker 120c that it manages if elected as a primary publisher in its respective network, and ignoring the subscription request if set as a secondary publisher in its respective network; or based on a determination that the first network device is locally accessible, creating one or more publication/subscription ("pub/sub") channels in its respective local control channel, and sending a subscription acknowledgement ("sub ack") message via at least one of an upstream messaging broker 120a that it manages or the local messaging broker 120b that it manages; in response to receiving the sub ack message from another broker manager, joining the one or more pub/sub channels, forwarding the sub ack message to a local control channel in an upstream network if elected as a primary publisher in its respective network, and ignoring the sub ack message if set as a secondary publisher in its respective network; or if the first client device is locally accessible to it, sending confirmation of subscription to the first client device via a client broker 115 that it manages, and receiving and routing one or more commands for the first network device from the first client device via the client broker and via at least one of the local messaging broker, a downstream messaging broker, or a mediator broker that it manages, based at least in part on the subscription data, without routing based on Internet Protocol ("IP") address of the first network device; and/or the like. In some instances, the ID of the network 140n may comprise at least one of a name, an alphanumeric ID, a numeric ID, or a unique ID, and/or the like, of the network 140n.

In operation, computing system 105 or broker manager 110 (collectively, "computing system" or "broker manager" or the like; e.g., computing system 105a and/or broker manager 110a, or the like) may receive a subscription request for subscribing to a first network device (e.g., network device 155a, or the like) from a first client device (e.g., client device 145a, or the like), in some cases, via a client broker (e.g., client broker 115a, or the like). The broker manager may determine whether the first network device is listed within a subscription table (e.g., subscription table 130, or the like). If so, and based on a determination that the first network device is not locally accessible by the first broker manager, the broker manager: may send or relay a message to the first client device indicating at least one of a subscription acknowledgement ("sub ack") message, a message indicating that one or more publication/subscription ("pub/sub") channels have been created for the first network device in at least a first network (i.e., network 140a within which the broker manager 110a is disposed or located, or the like) and a second network (i.e., network 140n within which the first network device 155a is disposed or located, or the like), or a message indicating that one or more intermediate broker managers between the broker manager and the first network device have joined the one or more pub/sub channels; and in response to receiving one or more commands for the first network device from the first client device, may route the one or more commands via at least one of an upstream messaging broker 120a, a local messaging broker 120b, or a downstream messaging broker 120c that is managed by the first broker manager, based at least in part on first subscription data associated with the first network device that is contained in the subscription table 130, without routing based on IP address of the first network device, the first subscription data comprising a name of the first network device and an ID of the second network within which the first network device is located. If so, and based on a determination that the first network device is locally accessible by the first broker manager (i.e., if broker manager 110n receives the request, or the like), the broker manager: may send or relay a message to the first client device indicating at least one of that a connection with the first network device has been established or that the first network device is ready to receive commands; and in response to receiving the one or more commands for the first network device from the first client device, may route the one or more commands (in some cases, via the client broker if the client device is also disposed within network 140n and is communicatively coupled to broker manager 110n, or the like; or via the upstream messaging broker 120a if the client device is disposed in an upstream network (e.g., network 140a-140(n−1), or the like) and via a mediator broker (e.g., mediator broker 125a, or the like) based at least in part on second subscription data associated with the first network device that is contained in the subscription table, without routing based on IP address of the first network device, the second subscription data comprising the name of the first network device and an ID of the first network, the mediator broker being managed by the first broker manager.

Based on a determination that the first network device is not listed within the subscription table, the broker manager: may poll at least one of the upstream messaging broker 120a, the local messaging broker 120b, or the downstream messaging broker 120c to determine whether a subscription for the first network device already exists; may dynamically identify and create subscriptions based at least in part on receiving one or more subscription acknowledgement ("sub ack") messages from one or more intermediate broker managers between the first broker manager and the first network device in one or more of the first network, a third network within which the first network device is determined to be located, or an intermediate network among at least one intermediate network between the first network and the third network; may autonomously fill one or more subscription fields in the subscription table based on the identified and created subscriptions; may send or relay a message to the first client device indicating at least one of a sub ack message, a message indicating that one or more publication/subscription ("pub/sub") channels have been created for the first network device in at least the first network and the third network, or a message indicating that one or more intermediate broker managers between the first broker manager and the first network device have joined the one or more pub/sub channels; and in response to receiving one or more commands for the first network device from the first client device, may route the one or more commands via at least one of the upstream messaging broker, the local messaging broker, or the downstream messaging broker, based at least in part on third subscription data associated with the first network device that is contained in the subscription table, without routing based on IP address of the first network device, the third subscription data comprising a name of the first network device and an ID of the third network within which the first network device is located. As shown in FIG. 1, name-based routing utilizes upstream and downstream communications and routing that can pass through firewalls 160 without having to open up ports and firewalls (as depicted by the communications lines between upstream and downstream messaging brokers 220a and 220c of broker managers in different networks 140 passing through firewalls 160 between said networks 140, or the like)

In some aspects, the name-based routing described herein may enable one or more of the following features or characteristics (or otherwise provides the following functionalities): (a) provides virtual direct connection between a client and a device in a different network, which is separated from the client network by firewall, or the like; (b) can read the device from anywhere in the network(s); (c) acts like a "layer 4 extension cord"; (d) can pass through firewalls without having to open up ports and firewalls (thereby providing secure routing without requiring changes to the firewalls and ports for each routing instance); (e) can route by network and name rather than by IP address (which is limited in number, resulting in potential IP conflicts, or the like; compared with name-based routing that may utilize different naming conventions across networks and may likely use geographical identifiers in their names, or the like).

These and other functions of the system 100 (and its components) are described in greater detail below with respect to FIGS. 2-4.

Figure 2A:
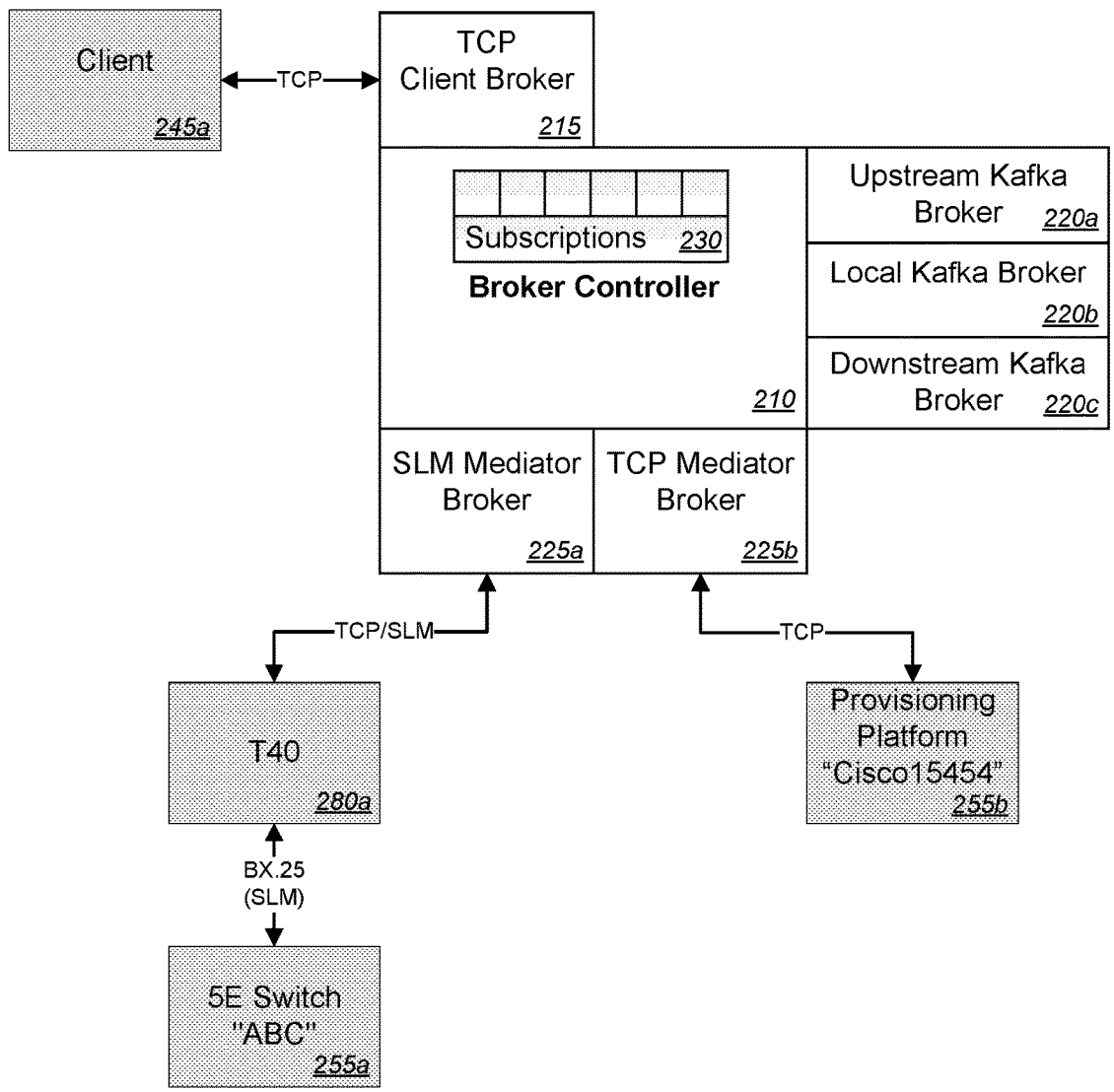
FIGS. 2A and 2B are schematic diagrams illustrating various non-limiting examples of broker managers and their interconnections with other components during implementation of name-based routing through networks, in accordance with various embodiments.
Figure 2B:
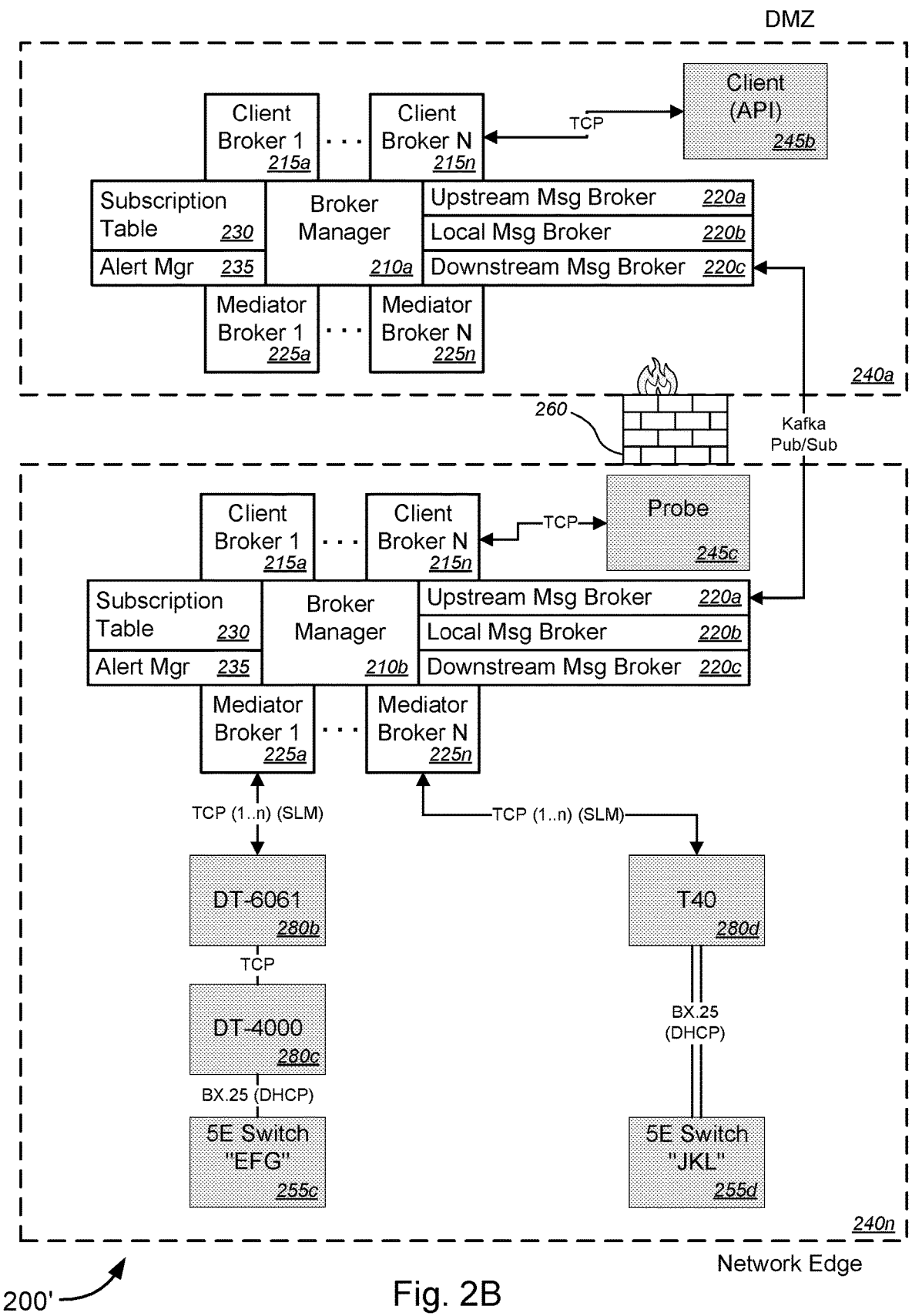

FIGS. 2A and 2B (collectively, "FIG. 2") are schematic diagrams illustrating various non-limiting examples 200 and 200' of broker managers and their interconnections with other components during implementation of name-based routing through networks, in accordance with various embodiments. FIG. 2A depicts a broker controller or manager 210 and a plurality of brokers that it controls or manages, as well as a stream-processing platform, message service, and/or message broker (and their corresponding protocols or the like) that each broker uses for communicating with other devices. FIG. 2B depicts interaction between two broker managers 210a and 210b that are disposed within different networks 240a and 240b that are separated by a firewall 260, as well as the brokers that each broker manager controls or manages and the corresponding stream-processing platform, message service, and/or message broker (and their corresponding protocols or the like) used for communicating with other devices.

As shown in the non-limiting embodiment 200 of FIG. 2A, broker controller or manager 210 may control or manage at least one of a client broker 215, one or more messaging brokers 220 (including, but not limited to, at least one of an upstream broker 220a, a local broker 220b, and/or a downstream broker 220c, and/or the like), or one or more mediator brokers 225a-225b, and/or the like. Client broker 215 may communicatively couple with client device 245a, using communications protocol, including, but not limited to, transmission control protocol ("TCP"), or the like. In some cases, client broker 215 may include, but is not limited to, one of a single-port client broker that communicatively couples with a single client device (e.g., client device 245a, or the like) or a multi-port client broker that communicatively couples with each of a plurality of client devices (not shown). In some instances, the client device 245a may include, but is limited to, one of a desktop computer, a laptop computer, a tablet computer, a smart phone, a mobile phone, a probe, or a NOC computing system or console, and/or the like.

Figure 3A:
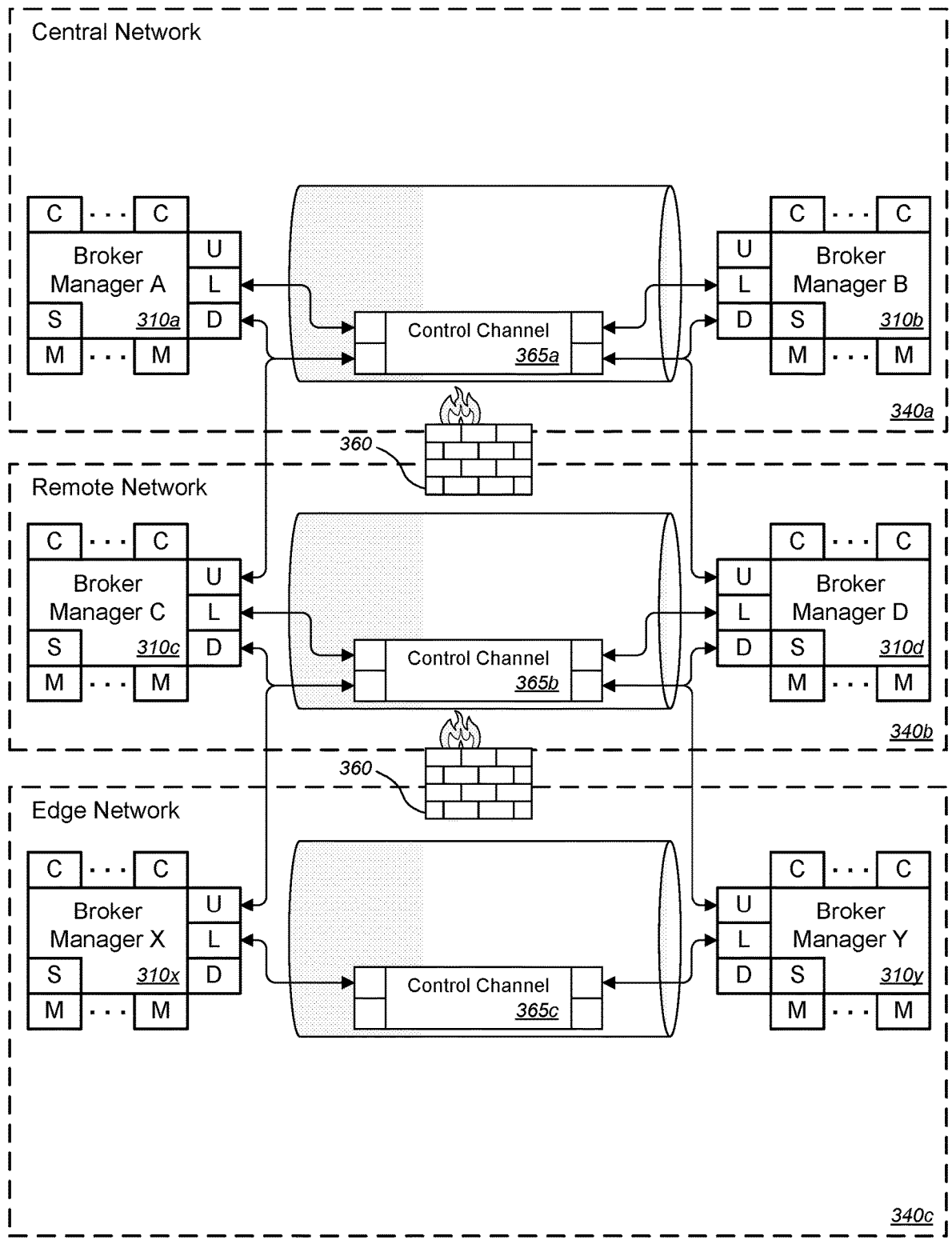
FIGS. 3A-3C are schematic diagrams illustrating a non-limiting set of examples of a plurality of broker managers and their interconnections with other components across a plurality of networks during implementation of name-based routing through networks, in accordance with various embodiments.
Figure 3B:
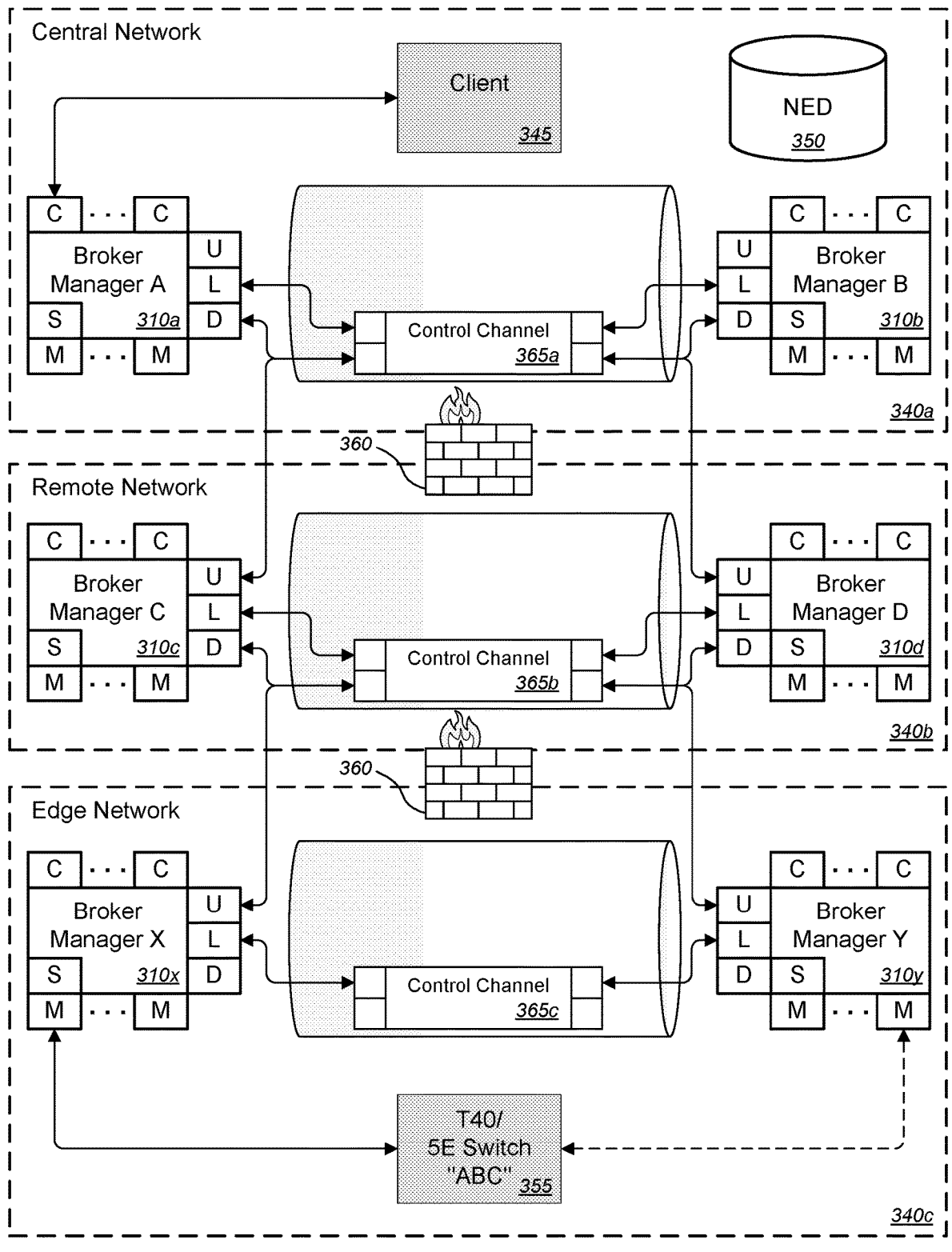
Figure 3C:
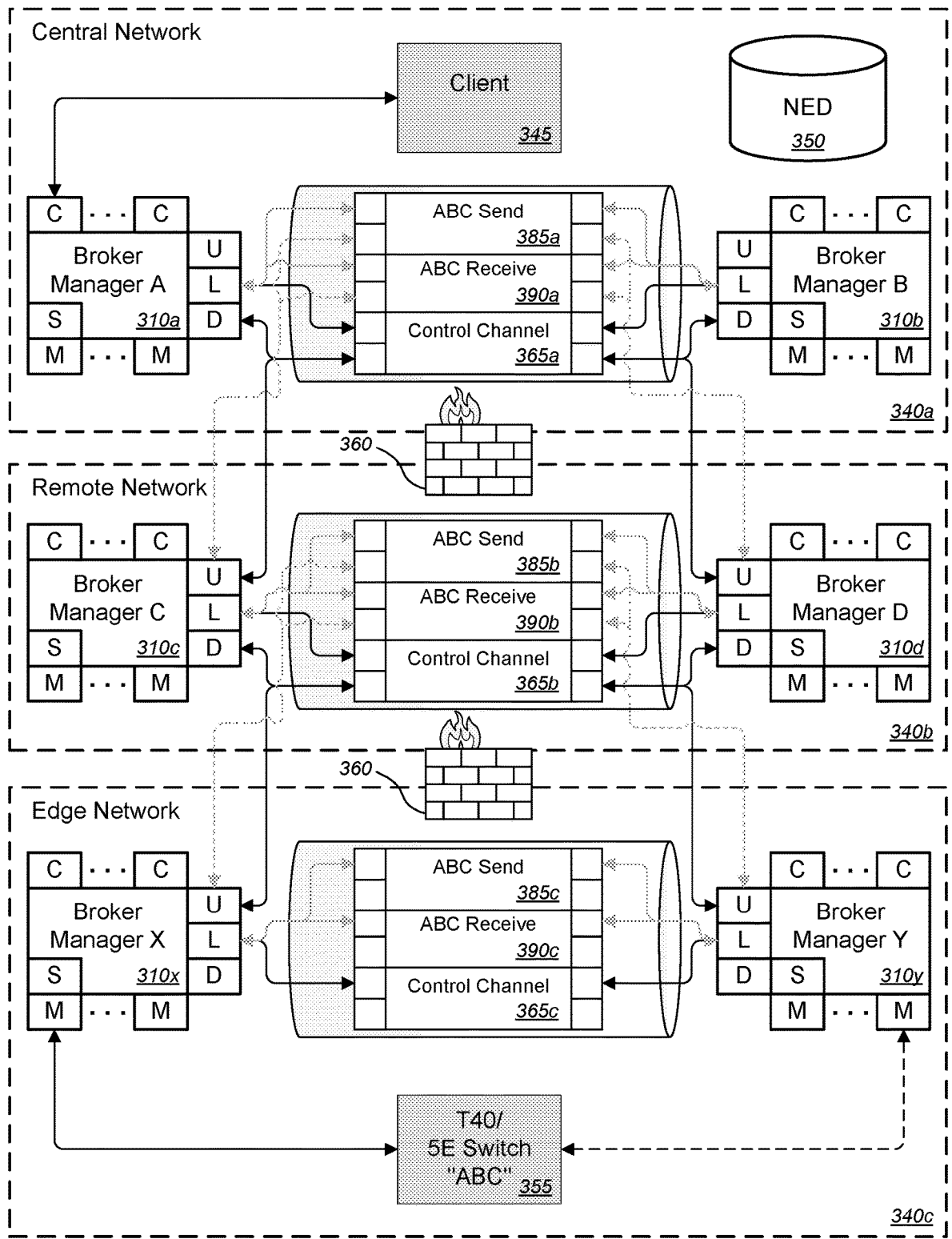

Each of the one or more messaging brokers 220 may communicatively couple with a control channel associated with a network (e.g., as shown in FIGS. 1 and 3A-3C, or the like), with the upstream broker 220a communicatively coupling with a control channel associated with an upstream network, while the local broker 220b communicatively couples with a local control channel associated with the network in which the broker manager 210 is disposed or located, and the downstream broker 220c communicatively couples with a control channel associated with a downstream network. Herein, the term "local" is in relation to the broker controller or manager 210, while the term "downstream" refers to networks or components thereof that are further along in a direction from the client device toward a network device with/to which the client device is trying to establish connection or trying to subscribe (in some cases, the client device is disposed in a central network, a demilitarized zone ("DMZ"), or a remote network, while the network device is disposed in an edge network or network edge, or the like, such as shown in FIGS. 2B, 3B, and 3C, or the like), and the term "upstream" refers to networks or components thereof that are further along in a direction from the network device toward the client device. Although FIG. 2A depicts Apache Kafka® as the stream-processing platform, message service, and/or message broker (and their corresponding protocols or the like) that each messaging broker 220 uses for communicatively coupling with their respective control channels, the various embodiments are not so limited, and any suitable stream-processing platform, message service, and/or message broker (and their corresponding protocols or the like) may be used, including, but not limited to, Apache Kafka®, Tibco®, representational state transfer ("REST"), Apache ActiveMQ®, Java® message service ("JMS"), RabbitMQ®, or HornetQ®, and/or the like.

Merely by way of example, in some cases, the one or more mediator brokers 225 may each include, without limitation, at least one of one or more serial line management ("SLM") mediator brokers (e.g., mediator broker 225a, or the like), one or more transmission control protocol ("TCP") mediator brokers (e.g., mediator broker 225b, or the like), one or more hypertext transfer protocol ("HTTP") mediator brokers (not shown), one or more secure shell protocol ("SSH") mediator brokers (not shown), or one or more simple network management protocol ("SNMP") mediator brokers (not shown), and/or the like. In some instances, each of at least one SLM mediator broker among the one or more SLM mediator brokers may be configured to mediate multiple connections to multiple client devices regardless of whether the network device to which it is communicatively coupled is only capable of single client-only connection. For example, although 5E switches (e.g., 5E switch named "ABC" 255a, as shown in FIG. 2A, or the like) each only allow one client to connect to it, SLM mediator broker 225a allows for or mediates multiple connections to multiple clients, and thus overcomes this design or hardware limitation of 5E switches. Also, because 5E switches are incapable of communicating via protocols such as TCP, or the like, an intermediary device (e.g., T40 switch 280a, which is capable of connecting up to 40 switches, or the like) must be used that translates TCP communications from/to a client device with SLM communications to/from the 5E switch.

In some instances, at least one of the client broker 215, the upstream messaging broker 220a, the local messaging broker 220b, the downstream messaging broker 220c, or the one or more mediator brokers 225a-225b, and/or the like, may be modular. In some instances, client broker 215 may be configured to be interchangeable with other client brokers 215, each messaging broker 220 may be configured to be interchangeable with other messaging brokers 220, and each mediator broker 225 may be configured to be interchangeable with other mediator brokers 225. In some cases, broker manager 210 may be communicatively coupled to/with and may manage at least one of one or more client brokers 215a215n, one or more messaging brokers 220a220c, or one or more mediator brokers 225a225n, and/or the like.

In a non-limiting example, client 245a may request subscription to 5E switch "ABC" 255a, by sending such request to broker manager 210, which receives such request via client broker 215 using TCP, or the like. In response to receiving the request, broker manager 210 may determine whether a subscription already exists for 5E switch "ABC" 255a, based on its subscription table 230. In this case, broker manager 210 may determine, based on its subscription table 230, that a subscription exists for 5E switch "ABC" 255a, with subscription data associated with 5E switch "ABC" 255a indicating name of the network device (in this case, "ABC" or the like), network in which the device is disposed or located (in this case, the same network as the broker manager 210, or the like), and other data, including, but not limited to, connection via SLM mediator broker 225a and intermediary network device 280a (in this case, T40 switch 280a, or the like, although not limited to such switches). Based on such determination, the broker manager 210 may send a message to client device 245a confirming subscription to 5E switch "ABC" 255a and/or a message to client device 245a indicating at least one of that a connection with 5E switch "ABC" 255a has been established or that 5E switch "ABC" 255a is ready to receive commands; and in response to receiving one or more commands for 5E switch "ABC" 255a from client device 245a, may route the one or more commands via client broker 215 (using TCP) and via SLM mediator broker 225a (using TCP/SLM) based at least in part on the subscription data associated with 5E switch "ABC" 255a that is contained in subscription table 230, without routing based on IP address of 5E switch "ABC" 255a. Any replies from 5E switch "ABC" 255a would travel in the reverse direction through the intermediary device 280a, the mediator broker 225a, the broker manager 210, and the client broker 215.

In another non-limiting example, client 245a may request subscription to provisioning platform "Cisco15454" 255b, by sending such request to broker manager 210, which receives such request via client broker 215 using TCP, or the like. In response to receiving the request, broker manager 210 may determine a subscription already exists for provisioning platform "Cisco15454" 255b, based on its subscription table 230. In this case, broker manager 210 may determine, based on its subscription table 230, that a subscription exists for provisioning platform "Cisco15454" 255b, with subscription data associated with provisioning platform "Cisco15454" 255b indicating name of the network device (in this case, "Cisco15454" or the like), network in which the device is disposed or located (in this case, the same network as the broker manager 210, or the like), and other data, including, but not limited to, connection via TCP mediator broker 225b. Based on such determination, the broker manager 210 may send a message to client device 245a confirming subscription to provisioning platform "Cisco15454" 255b and/or a message to client device 245a indicating at least one of that a connection with provisioning platform "Cisco15454" 255b has been established or that provisioning platform "Cisco15454" 255b is ready to receive commands; and in response to receiving one or more commands for provisioning platform "Cisco15454" 255b from client device 245a, may route the one or more commands via client broker 215 (using TCP) and via TCP mediator broker 225b (using TCP) based at least in part on the subscription data associated with provisioning platform "Cisco15454" 255b that is contained in subscription table 230, without routing based on IP address of provisioning platform "Cisco15454" 255b. Any replies from 5E switch "ABC" 255a would travel in the reverse direction through the mediator broker 225b, the broker manager 210, and the client broker 215.

As shown in the non-limiting embodiment 200' of FIG. 2B, broker managers 210a and 210b may each control or manage at least one of one or more client brokers 1 to N 215a-215n, one or more messaging brokers 220 (including, but not limited to, at least one of an upstream broker 220a, a local broker 220b, and/or a downstream broker 220c, and/or the like), one or more mediator brokers 1 to N 225a225n, a subscription table 230, or an alert manager 235, and/or the like. Client broker 215 may communicatively couple with client device 245a, using communications protocol, including, but not limited to, transmission control protocol ("TCP"), or the like. In some cases, client broker 215 may include, but is not limited to, one of a single-port client broker that communicatively couples with a single client device (e.g., client device 245a, or the like) or a multi-port client broker that communicatively couples with each of a plurality of client devices (not shown).

As shown in FIG. 2B, broker manager 210a that is disposed or located within network 240a (which may be a DMZ or remote network, or the like) may act as a central controller that manages subscriptions and routes traffic between client brokers 215 and mediator brokers 225, while also managing sending of alerts as necessary via alert manager 235, or the like. Alert manager 235 may be responsible for tracking loss of connection to the mediators and reporting those alerts to the central controller, even if the alert manager is in a different network (e.g., alert manager 235 that is communicatively coupled to broker manager 210b that is disposed in network edge 240b may send alerts to broker manager 210a that is disposed in DMZ 240a and that is acting as the central controller, or the like). Client devices 245 (e.g., client 245b or probe 245c, or the like) may authenticate through the client broker 215, and then may subscribe to virtual channels on one or more devices 255 connected (directly, or indirectly via intermediary devices 280, or the like) to the broker managers 210 via mediator brokers 225.

In a non-limiting example, client device 245b may request subscription to 5E switch "EFG" 255c, by sending such request to broker manager 210a, which receives such request via client broker N 215n using TCP (in some cases via a client API, or the like), or the like. In response to receiving the request, broker manager 210a may determine whether a subscription already exists for 5E switch "EFG" 255c, based on its subscription table 230. In this case, broker manager 210a may determine, based on its subscription table 230, that a subscription exists for 5E switch "EFG" 255c, with subscription data associated with 5E switch "EFG" 255c indicating name of the network device (in this case, "EFG" or the like), network in which the device is disposed or located (in this case, a network that is different from the network within which the broker manager 210a is disposed or located (e.g., network edge 240n, or the like), or the like), and other data, including, but not limited to, connection via downstream messaging broker 220c, upstream messaging broker 220a of broker manager 210b that is disposed in network edge 240n, mediator broker 1 225a of broker manager 210b, and intermediary network devices 280b and 280c (in this case, DT-6061 network switch 280b and DT-4000 network switch 280c, or the like, although not limited to such switches). Alternatively, the other data in subscription table 230 of broker manager 210a may include, but is not limited to, connection via downstream messaging broker 220c, control channel of network edge 240n (not shown), and/or broker manager 210b, and/or the like. Based on such determination, the broker manager 210a may send a message to client device 245b confirming subscription to 5E switch "EFG" 255c and/or a message to client device 245b indicating at least one of that a connection with 5E switch "EFG" 255c has been established or that 5E switch "EFG" 255c is ready to receive commands; and in response to receiving one or more commands for 5E switch "EFG" 255c from client device 245b, may route the one or more commands via client broker N 215n (using TCP), via downstream messaging broker 220c (using Kafka Pub/Sub, or the like), through firewall 260 between DMZ 240a and network edge 240n, and via broker manager 210b in network edge 240n, which may include routing via upstream messaging broker 220a of broker manager 210b and via mediator broker 1 225a of broker manager 210b (using TCP/SLM) based at least in part on the subscription data associated with 5E switch "EFG" 255c that is contained in its subscription table 230, without routing based on IP address of 5E switch "EFG" 255c. Network switch DT-6061 280b may relay the one or more commands to switch DT-4000 280c using TCP (or the like), while switch DT-4000 280c may relay the one or more commands to 5E switch "EFG" 255c using BX.25 or dynamic host configuration protocol ("DHCP") (or the like). Any replies from 5E switch "EFG" 255c would travel in the reverse direction through the intermediary devices 280b and 280c, the mediator broker 1 225a of broker manager 210b, the broker manager 210b, the upstream messaging broker 220a of broker manager 210b, the downstream messaging broker 220c of broker manager 210a, the broker manager 210a, and the client broker N 215n of broker manager 210a.

In another non-limiting example, client device 245b may request subscription to 5E switch "JKL" 255d, by sending such request to broker manager 210a, which receives such request via client broker N 215n using TCP (in some cases via a client API, or the like), or the like. In response to receiving the request, broker manager 210a may determine whether a subscription already exists for 5E switch "JKL" 255d, based on its subscription table 230. In this case, broker manager 210a may determine, based on its subscription table 230, that a subscription exists for 5E switch "JKL" 255d, with subscription data associated with 5E switch "JKL" 255d indicating name of the network device (in this case, "JKL" or the like), network in which the device is disposed or located (in this case, a network that is different from the network within which the broker manager 210a is disposed or located (e.g., network edge 240n, or the like), or the like), and other data, including, but not limited to, connection via downstream messaging broker 220c, upstream messaging broker 220a of broker manager 210b that is disposed in network edge 240n, mediator broker N 225n of broker manager 210b, and intermediary network device 280d (in this case, T40 switch 280d, or the like, although not limited to such switches). Alternatively, the other data in subscription table 230 of broker manager 210a may include, but is not limited to, connection via downstream messaging broker 220c, control channel of network edge 240n (not shown), and/or broker manager 210b, and/or the like. Based on such determination, the broker manager 210a may send a message to client device 245b confirming subscription to 5E switch "JKL" 255d and/or a message to client device 245b indicating at least one of that a connection with 5E switch "JKL" 255d has been established or that 5E switch "JKL" 255d is ready to receive commands; and in response to receiving one or more commands for 5E switch "JKL" 255d from client device 245b, may route the one or more commands via client broker N 215n (using TCP), via downstream messaging broker 220c (using Kafka Pub/Sub, or the like), through firewall 260 between DMZ 240a and network edge 240n, and via broker manager 210b in network edge 240n, which may include routing via upstream messaging broker 220a of broker manager 210b and via mediator broker N 225n of broker manager 210b (using TCP/SLM) based at least in part on the subscription data associated with 5E switch "JKL" 255d that is contained in subscription table 230, without routing based on IP address of 5E switch "JKL" 255d. Network switch T40 280d may relay the one or more commands to 5E switch "JKL" 255d using BX.25 or DHCP (or the like). Any replies from 5E switch "JKL" 255d would travel in the reverse direction through the intermediary device 280d, the mediator broker N 225n of broker manager 210b, the broker manager 210b, the upstream messaging broker 220a of broker manager 210b, the downstream messaging broker 220c of broker manager 210a, the broker manager 210a, and the client broker N 215n of broker manager 210a.

According to some embodiments, broker manager 210a in DMZ 240a may communicatively couple with broker manager 210b in network edge 240n either via downstream messaging broker 220c of broker manager 210a in DMZ 240a communicatively coupling with upstream messaging broker 220a of broker manager 210b in network edge 240n (such as shown in FIG. 2B) or via downstream messaging broker 220c of broker manager 210a in DMZ 240a communicatively coupling with local messaging broker 220b of broker manager 210b in network edge 240n via the control channel of network edge 240n (not shown in FIG. 2B). Also, in alternative embodiments, although not shown in FIG. 2, instead of communicatively coupling via messaging brokers 220, broker manager 210a in DMZ 240a may communicatively couple with broker manager 210b in network edge 240n via a mediator broker 225 of broker manager 210a and via a client broker 215 of broker manager 210b (in some cases, via the control channel of network edge 240n (not shown in FIG. 2B)), or the like.

In yet another non-limiting example, probe 245c may request subscription to 5E switch "EFG" 255c, by sending such request to broker manager 210b, which receives such request via client broker N 215n using TCP, or the like. In response to receiving the request, broker manager 210b may determine whether a subscription already exists for 5E switch "EFG" 255c, based on its subscription table 230. In this case, broker manager 210b may determine, based on its subscription table 230, that a subscription exists for 5E switch "EFG" 255c, with subscription data associated with 5E switch "EFG" 255c indicating name of the network device (in this case, "EFG" or the like), network in which the device is disposed or located (in this case, the same network as the broker manager 210b (e.g., network edge 240n, or the like), or the like), and other data, including, but not limited to, connection via mediator broker 1 225a and intermediary network devices 280b and 280c (in this case, DT-6061 network switch 280b and DT-4000 network switch 280c, or the like, although not limited to such switches). Based on such determination, the broker manager 210b may send a message to probe 245c confirming subscription to 5E switch "EFG" 255c and/or a message to probe 245c indicating at least one of that a connection with 5E switch "EFG" 255c has been established or that 5E switch "EFG" 255c is ready to receive commands; and in response to receiving one or more commands for 5E switch "EFG" 255c from probe 245c, may route the one or more commands via client broker N 215n(using TCP) and via mediator broker 1 225a (using TCP/SLM) based at least in part on the subscription data associated with 5E switch "EFG" 255c that is contained in its subscription table 230, without routing based on IP address of 5E switch "EFG" 255c. Network switch DT-6061 280b may relay the one or more commands to switch DT-4000 280c using TCP (or the like), while switch DT-4000 280c may relay the one or more commands to 5E switch "EFG" 255c using BX.25 or DHCP (or the like). Any replies from 5E switch "EFG" 255c would travel in the reverse direction through the intermediary devices 280b and 280c, the mediator broker 1 225a, the broker manager 210b, and the client broker N 215n.

In still another non-limiting example, probe 245c may request subscription to 5E switch "JKL" 255d, by sending such request to broker manager 210b, which receives such request via client broker N 215n using TCP, or the like. In response to receiving the request, broker manager 210b may determine whether a subscription already exists for 5E switch "JKL" 255d, based on its subscription table 230. In this case, broker manager 210b may determine, based on its subscription table 230, that a subscription exists for 5E switch "JKL" 255d, with subscription data associated with 5E switch "JKL" 255d indicating name of the network device (in this case, "JKL" or the like), network in which the device is disposed or located (in this case, the same network as the broker manager 210b (e.g., network edge 240n, or the like), or the like), and other data, including, but not limited to, connection via mediator broker N 225n and intermediary network device 280d (in this case, T40 switch 280d, or the like, although not limited to such switches). Based on such determination, the broker manager 210b may send a message to probe 245c confirming subscription to 5E switch "JKL" 255d and/or a message to probe 245c indicating at least one of that a connection with 5E switch "JKL" 255d has been established or that 5E switch "JKL" 255d is ready to receive commands; and in response to receiving one or more commands for 5E switch "JKL" 255d from probe 245c, may route the one or more commands via client broker N 215n (using TCP) and via mediator broker N 225n (using TCP/SLM) based at least in part on the subscription data associated with 5E switch "JKL" 255d that is contained in subscription table 230, without routing based on IP address of 5E switch "JKL" 255d. Network switch T40 280d may relay the one or more commands to 5E switch "JKL" 255d using BX.25 or DHCP (or the like). Any replies from 5E switch "JKL" 255d would travel in the reverse direction through the intermediary device 280d, the mediator broker N 225n, the broker manager 210b, and the client broker N 215n.

In some embodiments, broker controller or managers 210, 210a, and 210b, client brokers 215 and 215a215n, upstream messaging brokers 220a, local messaging brokers 220b, downstream messaging brokers 220c, mediator brokers 225a225n, subscription tables 230, alert managers 235, networks 240a and 240b, clients or probes 245a245c, network devices 255a-255c, and firewall 260 of FIG. 2 may be similar, if not identical, to broker managers 110, 110a-110n, and 110a'-110n', client brokers 115a-115n, upstream messaging brokers 120a, local messaging brokers 120b, downstream messaging brokers 120c, mediator brokers 125a-125n, subscription tables 130, alert managers 135, networks 140a-140n, clients devices 145a-145n, network devices 155a-155n, and firewalls 160, respectively, of system 100 of FIG. 1, and the description of these components of system 100 of FIG. 1 are similarly applicable to the corresponding components of FIG. 2.

These and other functions of the examples 200 and 200' (and their components) are described in greater detail below with respect to FIGS. 1, 3, and 4.

FIGS. 3A-3C (collectively, "FIG. 3") are schematic diagrams illustrating a non-limiting set of examples 300 of a plurality of broker managers and their interconnections with other components across a plurality of networks during implementation of name-based routing through networks, in accordance with various embodiments.

As shown in the non-limiting embodiment 300 of FIG. 3, broker managers A 310a and B 310b may be disposed or located within central network 310a (also referred to as "enterprise network" or the like), while broker managers C 310c and D 310d may be disposed or located within remote network 310b, and broker managers X 310x and Y 310y may be disposed or located within edge network 310c, with each of networks 310a310c comprising its respective control channel 365a365c, and with the networks 340 separated from each other (or at least from upstream/downstream network pairs) by firewall(s) 360. For simplicity of illustration, the example workflow(s) described below involves a client (e.g., client device 345, or the like), a network device (e.g., T40/5E switch "ABC" 355, or the like), and a NED (e.g., NED 350, or the like). In some cases, each subscription table S associated a corresponding broker manager 310 may be maintained and updated within a network element database (e.g., NED 350, or the like).

In some embodiments, broker controller or managers 310a, 310b, 310c, 310d, 310x, and 310y, client brokers (denoted by "C" blocks), upstream messaging brokers (denoted by "U" blocks), local messaging brokers (denoted by "L" blocks), downstream messaging brokers (denoted by "D" blocks), mediator brokers (denoted by "M" blocks), networks 340a-340c, client device 345, NED 350, network device 355, and firewall 360 of FIG. 3 may be similar, if not identical, to broker managers 110, 110a110n, and 110a'-110n', client brokers 115a-115n, upstream messaging brokers 120a, local messaging brokers 120b, downstream messaging brokers 120c, mediator brokers 125a-125n, networks 140a-140n, clients devices 145a-145n, NED 150, network devices 155a-155n, and firewalls 160, respectively, of system 100 of FIG. 1, and the description of these components of system 100 of FIG. 1 are similarly applicable to the corresponding components of FIG. 3.

With reference to the non-limiting example of FIG. 3A, upon or after start up or initialization, broker manager X 310x, which is disposed in edge network 340c, may bring up or initialize at least one of one or more configured mediator brokers M, one or more client brokers C, and/or one or more messaging brokers U, L, and/or D, and/or the like. Broker manager X 310x may then connect to its local control channel 365c, via its local messaging broker L, and may connect to an upstream control channel 365b in remote network 340b (which is a network upstream of edge network 340c), via its upstream messaging broker U. Broker manager X 310x may send a "Hello" message on local control channel 365c, via its local messaging broker L. Broker manager Y 310y, which is also disposed in edge network 340c, may receive the "Hello" message, may mark the presence of broker manager X 310x, and may send a "Hello Ack" (or "Hello Acknowledgement") message on local control channel 365c, via its local messaging broker L. Broker manager X 310x may receive the "Hello Ack" message from broker manager Y 310y and may mark presence of broker manager Y 310y.

Broker manager X 310x or broker manager Y 310y may call for an election for establishment which will be primary publisher in edge network 340c. For simplicity of illustration, broker manager X 310x and broker manager Y 310y agree that broker manager X 310x will become primary publisher, and similarly, broker manager C 310c in remote network 340b and broker manager A 310a in central network 340a are elected primary publishers in their respective networks.

Broker manager X 310x may send a "Hello" message to upstream control channel 365b in remote network 340b, via its upstream messaging broker U. Broker manager C 310c and broker manager D 310d may mark the presence of broker manager X 310x, and may send "Hello Ack" messages on their local control channel 365b. Broker manager X 310x may receive the "Hello Ack" messages on the upstream control channel 365b in remote network 340b, via its upstream messaging broker U, and may mark the presence of both broker manager C 310c and broker manager D 310d. Broker manager X 310x is now ready to begin processing requests. Likewise, the other broker managers 310 perform similar processes as part of their start-up or initialization operations, and/or in response to detected changes in their respective network(s) and/or upstream/downstream network(s) 340, or the like.

Turning to the non-limiting example of FIG. 3B, client device 345, which is disposed in central network 340a, may send a subscription request for device or network device "ABC" 355 (e.g., T40/5E switch "ABC" 355, or the like). Broker manager A 310a, which is also disposed in central network 340a, may receive the subscription request via one of its client brokers C, and may add the subscription (i.e., for network device "ABC" or the like) to its subscription or subs table "S" (similar to subscription tables or "S" 130 and 230 in FIGS. 1 and 2, or the like). Broker manager A 310a does not know device ABC 355 locally, so may send the request to its local control channel 365a, via its local messaging broker L. Broker manager b 310b, which is also disposed in central network 340a, may receive the subscription request on local control channel 365a, via its local messaging broker L. Because it does not know device ABC 355 locally, and because it is not the primary publisher for central network 340a, broker manager B 310c may drop or ignore the subscription request.

Broker manager C 310c, which is disposed in remote network 340b, may receive the subscription request on upstream control channel 365a in central network 340b, via its upstream messaging broker U. Because it does not know device ABC 355 locally, and because it is the primary publisher for remote network 340b, broker manager C 310c may store the subscription request in its subs table S (similar to subscription tables or "S" 130 and 230 in FIGS. 1 and 2, or the like), and may forward the request to local control channel 365b, via its local messaging broker L. Broker manager D 310d, which is also disposed in remote network 340b, may receive the subscription request on upstream control channel 365a in central network 340b, via its upstream messaging broker U. Because it does not know device ABC 355 locally, and because it is not the primary publisher for remote network 340b, broker manager D 310d may store the subscription or sub in its subs table S, without forwarding the request on local control channel 365b. Broker manager D 310d may receive the subscription request again from broker manager C 310c on local control channel 365b, via its local messaging broker L. Because it does not know device ABC 355 locally, and because it is not the primary publisher for remote network 340b, broker manager D 310d may drop or ignore the subscription request.

Broker manager Y 310y may receive the subscription request on upstream control channel 365b in remote network 340b, via its upstream messaging broker U. Because it does not know device ABC 355 locally, and because it is not the primary publisher for edge network 340c, broker manager Y 310y may store the subscription or sub in its subs table S, without forwarding the request on local control channel 365c. Broker manager X 310x may receive the subscription request on upstream control channel 365b in remote network 340b, via its upstream messaging broker U. Broker manager X 310x knows device ABC locally, and because it is the primary publisher in edge network 340c, it may store the subscription request in its subs table S, may create the pub/sub channels in upstream control channel 365b in remote network 340b, and may send a "Sub Ack" (or "Sub Acknowledgement") message together with channel information on upstream control channel 365b in remote network 340b, via its upstream messaging broker U. Broker manager X 310x may also create the pub/sub channels local control channel 365c, and may send the "Sub Ack" message to local control channel 365c, via its local messaging broker L. Broker manager Y 310y may receive the "Sub Ack" message, and may join the publisher or pub/sub channels on upstream control channel 365b and/or local control channel 365c.

Broker managers C 310c and D 310d may receive the "Sub Ack" message on their local control channel 365b, via their respective local messaging broker L, and may create and join the pub/sub channels on local control channel 365b. Broker manager C 310c is the primary publisher, so it forwards the "Sub Ack" message to upstream control channel 365a in central network 340b, via its upstream messaging broker U. Broker managers C 310c and D 310d may join the pub/sub channels on upstream control channel 365a.

Broker managers A 310a and B 310b may receive the "Sub Ack" message on their local control channel 365c, via their respective local messaging broker L. Broker manager A 310a may then forward any traffic from the Pub/Sub channel to its local (TCP) client broker C where the sub request originated. Broker manager A 310a may send confirmation of subscription to client device 345 via client broker C.

Referring to the non-limiting example of FIG. 3C, client device 345 may send one or more commands. Broker manager A 310a may receive the one or more commands from client device 345 and may forward the one or more commands to local "ABC Send" channel 385a, via its local messaging broker L. Broker manager b 310b may receive the one or more commands on local "ABC Send" channel 385a, via its local messaging broker L, and may ignore them as it is not the primary publisher.

Broker managers C 310c and D 310d may receive the one or more commands on upstream "ABC Send" channel 385a, via their respective upstream messaging broker U. Broker manager C 310c may forward the one or more commands to local "ABC Send" channel 385b. Broker manager D 310d may ignore the one or more commands as it is not the primary publisher.

Broker managers X 310x and Y 310y may receive the one or more commands on upstream "ABC Send" channel 385b, via their respective upstream messaging broker U. Broker manager X 310x knows device ABC 355 locally, so it may send the one or more commands to device ABC 355, via its mediator broker M. In some cases, broker manager X 310x may also forward the one or more commands to is "ABC Send" channel 385c, via its local messaging broker L. Broker manager Y 310y is not the primary publisher and does not know device ABC locally, so it ignores the one or more commands.

Broker manager X 310x may receive a response from device ABC 355, via its mediator broker M. Broker manager X 310x is the primary publisher, so it may send the response to both local "ABC Receive" channel 390c, via its local messaging broker L, and upstream "ABC Receive" channel 390b, via its upstream messaging broker U. In cases of broker manager X 310x failing, operations may failover to broker manager Y 310y as the secondary publisher (which is configured to be on hot standby) in edge network 340c, and thus would result in broker manager Y 310y attempting to establish direct communication with device ABC 355, via its mediator broker M (as denoted in FIG. 3C by the dash-lined double arrows between device ABC 355 and mediator broker M of broker manager Y 310y, or the like).

Broker managers C 310c and D 310d may receive response on local "ABC Receive" channel 390b, via their respective local messaging broker L. Neither has a local subscription, so broker manager C 310c, as the primary publisher for remote network 340b, may forward the response to upstream "ABC Receive" channel 390a, via its upstream messaging broker U. Broker manager D 310d may ignore the response.

Broker managers A 310a and B 310b may receive the response on local "ABC Receive" channel 390a, via their respective local messaging broker L. Broker manager A has a local subscription, so it may send the response to client device 345, via its client broker C. Broker manager B 310b may ignore the response.

The workflow of FIGS. 3A-3C are merely illustrative, and are not limited to the particular processes described above. Rather, any suitable alternative processes may be implemented based on name-based routing in accordance with the various embodiments described herein throughout.

Further, although some commands and messages (such as "Hello" message, "Hello Ack" message, "Subscribe" request, "Commands," etc.) are specifically described, these are not the only messages or commands that may be used during implementation of name-based routing. In some cases, the "Hello" message is used by a broker manager to announce that it is alive; if sent through an upstream messaging broker U, it must include "Neighbor Relation" parameter set to "DOWNSTREAM," and if sent through a local messaging broker L, neighbor adjacency may be calculated by the neighbor receiving the "Hello" message. In some instances, the "Hello Ack" message may be used to acknowledge receipt of the "Hello" message from a neighbor; if the "Hello" message was received by an upstream messaging broker U, it must include the "Neighbor Relation" parameter set to "DOWNSTREAM," otherwise the broker manager may calculate the neighbor relation based on which broker it receives the "Hello Ack" message from. In some cases, the "Subscribe" request may be used to request a new subscription to a device. In some instances, the "Subscribe Ack" message may be used to confirm access to a device from the previous "Subscribe" request; this confirmation may also contain information regarding how to communicate with the device (e.g., which Kafka channels or pub/sub channels to send and receive data to and from the device). In some cases, the "Subscribe NACK" message may be used to indicate that subscription to the device has failed, in some cases, because the device has been marked as in alarm or in alert by an alert manager, or the like. In some instances, the "Unsubscribe" command or request may be used to request to cancel a subscription from a client to a device. In some cases, the "Unsubscribe Ack" message may be used to confirm that the subscription has been cancelled. In some instances, the "Local Device Configuration Request" request may be used by a broker manager to request its upstream neighbors to obtain the local devices for a particular mediator's subnet. In some cases, the "Local Device Configuration Response" message may be used to respond to the broker manager's upstream request for local devices; the packet may contain a list of all devices local to that subnet and their corresponding connection information (e.g., IP address, port, name, network, etc.). In some instances, the "Update Local Device Configuration" command is similar to the "Local Devices Configuration Request" except that it comes downstream from an upstream neighbor, and is a command for any broker manager that has a mediator in the specified subnet to reload its configuration for that subnet; this command may be sent if there is a change to the configured devices (e.g., change in the database), or it could also potentially be initiated in an ad hoc manner. In some cases, some broker managers may not include a configuration manager; typically, only the toplevel broker managers will have a configuration manager, but others may request configurations via command channels, or the like.

These and other functions of the example 300 (and its components) are described in greater detail below with respect to FIGS. 1, 2, and 4.

FIGS. 4A-4J (collectively, "FIG. 4") are flow diagrams illustrating a method for implementing name-based routing through networks, in accordance with various embodiments. Method 400 of FIG. 4A continues onto FIG. 4B following the circular marker denoted, "A," and continues onto FIG. 4C following the circular marker denoted, "B." Method 400 of FIG. 4B, 4C, 4H, or 4I continues onto FIG. 4E following the circular marker denoted, "C." Method 400 of FIG. 4F continues onto FIG. 4G following the circular marker denoted, "D," and continues onto FIG. 4H following the circular marker denoted, "E." Method 400 of FIG. 4G continues onto FIG. 4I following the circular marker denoted, "F."

While the techniques and procedures are depicted and/or described in a certain order for purposes of illustration, it should be appreciated that certain procedures may be reordered and/or omitted within the scope of various embodiments. Moreover, while the method 400 illustrated by FIG. 4 can be implemented by or with (and, in some cases, are described below with respect to) the systems, examples, or embodiments 100, 200, 200', and 300 of FIGS. 1, 2A, 2B, and 3, respectively (or components thereof), such methods may also be implemented using any suitable hardware (or software) implementation. Similarly, while each of the systems, examples, or embodiments 100, 200, 200', and 300 of FIGS. 1, 2A, 2B, and 3, respectively (or components thereof), can operate according to the method 400 illustrated by FIG. 4 (e.g., by executing instructions embodied on a computer readable medium), the systems, examples, or embodiments 100, 200, 200', and 300 of FIGS. 1, 2A, 2B, and 3 can each also operate according to other modes of operation and/or perform other suitable procedures.

Figure 4A:
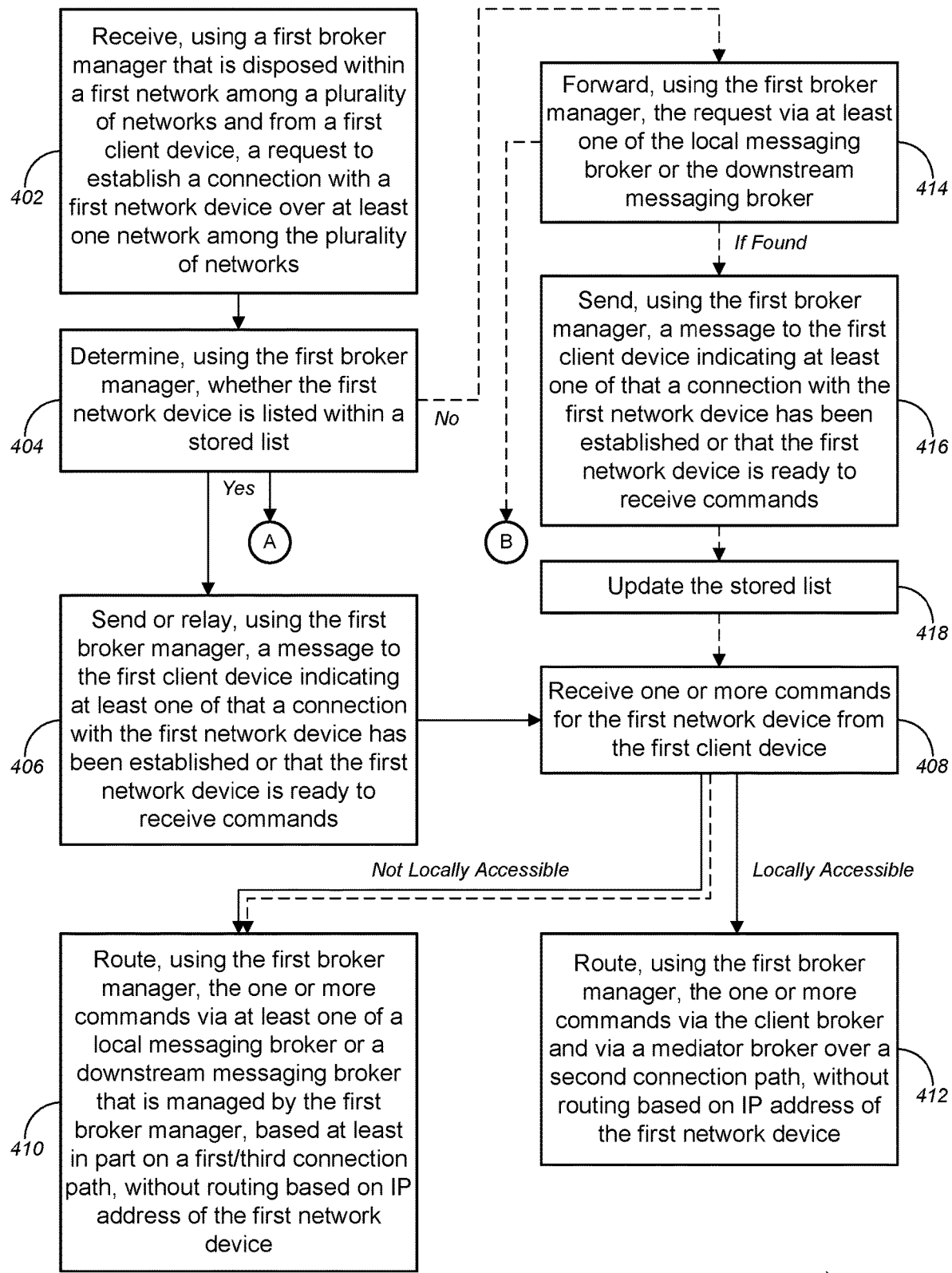

In the non-limiting embodiment of FIG. 4A, method 400, at block 402, may comprise receiving, using a first broker manager that is disposed within a first network among a plurality of networks and from a first client device, a request to establish a connection with a first network device over at least one network among the plurality of networks. At block 404, method may comprise determining, using the first broker manager, whether the first network device is listed within a stored list together with a connection path at least between the first broker manager and the first network device over the at least one network. If not, method 400 may continue onto the process at block 414 (whose flow is denoted by the dash-lined arrows between process blocks). If so, method 400 either may continue onto the process at block 406 (whose flow is denoted by the solid-lined arrows between process blocks) and/or may continue onto the process at block 420 in FIG. 4B following the circular marker denoted, "A."

At block 406, method 400 may comprise, based on a determination that the first network device is listed within the stored list together with a first connection path at least between the first broker manager and the first network device over the at least one network, sending or relaying, using the first broker manager, a message to the first client device indicating at least one of that a connection with the first network device has been established or that the first network device is ready to receive commands. Method 400 may further comprise, at block 408, receiving one or more commands for the first network device from the first client device. Method 400 may further comprise, based on a determination that the first network device is not locally accessible by the first broker manager, and, in response to receiving the one or more commands for the first network device from the first client device, routing, using the first broker manager, the one or more commands via at least one of a local messaging broker or a downstream messaging broker that is managed by the first broker manager, based at least in part on a first connection path, without routing based on Internet Protocol ("IP") address of the first network device (block 410), the first connection path comprising a name of the first network device and an identifier ("ID") of a second network within which the first network device is located. Alternatively, method 400 may further comprise, based on a determination that the first network device is locally accessible by the first broker manager, and, in response to receiving the one or more commands for the first network device from the first client device, routing, using the first broker manager, the one or more commands via the client broker and via a mediator broker over a second connection path, without routing based on IP address of the first network device (block 412), the second connection path comprising a name of the first network device and an ID of the first network, the mediator broker being managed by the first broker manager.

At block 414, method 400 may comprise forwarding, using the first broker manager, the request via at least one of the local messaging broker or the downstream messaging broker. Method 400 either may continue onto the process at block 416 and/or may continue onto the process at block 428 in FIG. 4C following the circular marker denoted, "B." At block 416, after receiving a message from at least one other broker manager that is disposed within the plurality of networks indicating at least one of that a third connection path exists between the first broker manager and the first network device or that the first network device has been found, sending, using the first broker manager, a message to the first client device indicating at least one of that a connection with the first network device has been established or that the first network device is ready to receive commands, or the like. Method 400, at block 418, may comprise updating the stored list with the third connection path in association with the first network device by either the first broker manager or one of the at least one other broker manager. Method 400 may then continue onto the processes at blocks 408 and 410. At block 410, in particular, method 400 may comprise, in response to receiving the one or more commands for the first network device from the first client device, routing, using the first broker manager, the one or more commands (via the client broker and) via the at least one of the local messaging broker or the downstream messaging broker, based at least in part on the third connection path, without routing based on IP address of the first network device, the third connection path comprising a name of the first network device and an ID of a third network within which the first network device is located.

In some embodiments, the first client device may be disposed within the first network. In some cases, receiving the request to establish the connection with the first network device from the first client device may comprise receiving, using the first broker manager and from the first client device, the request via a client broker. In some instances, the local messaging broker may communicatively couple with a control channel associated with the first network. In some cases, the downstream messaging broker may communicatively couple with a control channel associated with one of the second network or an intermediate network among one or more intermediate networks between the first network and the second network. In some instances, the ID of the second network comprises at least one of a name, an alphanumeric ID, a numeric ID, or a unique ID of the second network, and/or the like. In some cases, each of the control channel associated with the first network, the control channel associated with the second network, and the control channel associated with the intermediate network may be clustered across multiple servers in its respective network.

In some instances, the mediator broker may comprise at least one of one or more serial line management ("SLM") mediator brokers, one or more transmission control protocol ("TCP") mediator brokers, one or more hypertext transfer protocol ("HTTP") mediator brokers, one or more secure shell protocol ("SSH") mediator brokers, or one or more simple network management protocol ("SNMP") mediator brokers, and/or the like. In some cases, each of at least one SLM mediator broker among the one or more SLM mediator brokers may be configured to mediate multiple connections to multiple client devices regardless of whether the first network device to which it is communicatively coupled is only capable of single client-only connection. In some instances, one or more of the client broker, the local messaging broker, the downstream messaging broker, or the mediator broker that are managed by the first broker manager may be modular. In some cases, the client broker may be configured to be interchangeable with other client brokers, each messaging broker may be configured to be interchangeable with other messaging brokers, and the mediator broker may be configured to be interchangeable with other mediator brokers. In some instances, the first broker manager may be communicatively coupled to and may manage at least one of one or more client brokers, one or more messaging brokers, or one or more mediator brokers, and/or the like. In some cases, each client broker may comprise one of a single-port client broker that communicatively couples with a single client device or a multi-port client broker that communicatively couples with each of a plurality of client devices.

In some cases, the first client device may be disposed within a fourth network among the plurality of networks. In some instances, receiving the request to establish the connection with the first network device from the first client device may comprise receiving, using the first broker manager and from the first client device, the request via a second broker manager that is locally coupled with the first client device via its client broker and via an upstream messaging broker that is communicatively coupled with a control channel associated with one of the fourth network or an intermediate network among one or more intermediate networks between the first network and the fourth network, the upstream messaging broker being managed by the first broker manager. In some cases, sending or relaying the message to the first client device may comprise relaying, using the first broker manager, the message to the first client device via the upstream messaging broker and via the second broker manager. In some instances, routing the one or more commands may comprise routing, using the first broker manager, the one or more commands via at least one of the upstream messaging broker, the local messaging broker, or the downstream messaging broker, based at least in part on the first connection path, without routing based on IP address of the first network device.

According to some embodiments, the first connection path may further comprise one or more communications channels between the first broker manager and the first network device, the one or more communications channels being joined by one or more intermediate broker managers between the first broker manager and the first network device. In some cases, the stored list may be maintained and updated within a network element database ("NED"). In some instances, the plurality of networks may be separated from each other by firewalls. Merely by way of example, in some cases, the first network device may comprise one of a network switch, an intermediary device, a multiservice provisioning platform, a gateway device, a network node, a router, a network security or firewall appliance, a telephone electronic switching system, an optical network switch and routing platform, a wavelength division multiplexing ("WDM")—based optical transport network system, a network transmission system, a server, or a user device, and/or the like.

At block 420 in FIG. 4B (following the circular marker denoted, "A," in FIG. 4A), method 400 may comprise determining, using the first broker manager, whether any alerts associated with the first network device have been received by an alert manager that is communicatively coupled with the first broker manager. Method 400, at block 422, may comprise performing at least one of the following, without polling other broker managers regarding the status of the first network device and without attempting to connect to the first network device via one or more brokers that are managed by the first broker manager: based on a determination that an alert has been received that indicates that the first network device is offline, sending or relaying, using the first broker manager, a message to the first client device indicating that the first network device is offline (block 424); or based on a determination that an alert has been received that indicates that a connection to the first network device is currently lost, sending or relaying, using the first broker manager, a message to the first client device indicating that a connection to the first network device is currently lost (block 426); and/or the like.

Method 400 may continue onto the process at block 442 in FIG. 4E following the circular marker denoted, "C."

At block 428 in FIG. 4C (following the circular marker denoted, "B," in FIG. 4A), method 400 may comprise, after receiving a message from at least one other broker manager that is disposed within the plurality of networks indicating that the first network device is offline, updating, using the first broker manager, the stored list to indicate that the first network device is offline; and sending or relaying, using the first broker manager, a message to the first client device indicating that the first network device is offline (block 430). Alternatively, or additionally, method 400 (following the circular marker denoted, "B," in FIG. 4A) may comprise, after receiving a message from at least one other broker manager that is disposed within the plurality of networks indicating that a connection to the first network device is currently lost, updating, using the first broker manager, the stored list to indicate that a connection to the first network device is currently lost (block 432); and sending or relaying, using the first broker manager, a message to the first client device indicating that a connection to the first network device is currently lost (block 434).

Method 400 may continue onto the process at block 442 in FIG. 4E following the circular marker denoted, "C."

Referring to FIG. 4D, in some embodiments, the stored list may comprise a subscription table associated with the first broker manager. In some cases, forwarding the request (at block 414) may comprise polling, using the first broker manager, at least one of the local messaging broker or the downstream messaging broker to determine whether a subscription for the first network device already exists (block

436). Method 400 may further comprise, at block 438, dynamically identifying and creating, using the first broker manager, subscriptions based at least in part on receiving one or more subscription acknowledgement ("sub ack") messages from one or more intermediate broker managers between the first broker manager and the first network device in one or more of the first network, the third network, or an intermediate network among at least one intermediate network between the first network and the third network. Method 400 may further comprise autonomously filling, using the first broker manager, one or more subscription fields in the subscription table based on the identified and created subscriptions (block 440).

With reference to FIG. 4E, method 400 (following the circular marker denoted, "C," in one of FIG. 4B, FIG. 4C, FIG. 4H, or FIG. 4I) may comprise at least one of: issuing, using the alert manager, a trouble ticket for the first network device (block 442); sending, using the alert manager, a message to a technician to repair at least one of the first network device or the connection to the first network device (block 444); sending, using the alert manager, an alert associated with the first network device to a fault management system (e.g., RFM 170 of FIG. 1, or the like) (block 446); or updating, using the first broker manager, the subscription table based at least in part on received status information associated with at least one of the first network device or the connection to the first network device (block 448); and/or the like.

Figure 4F:
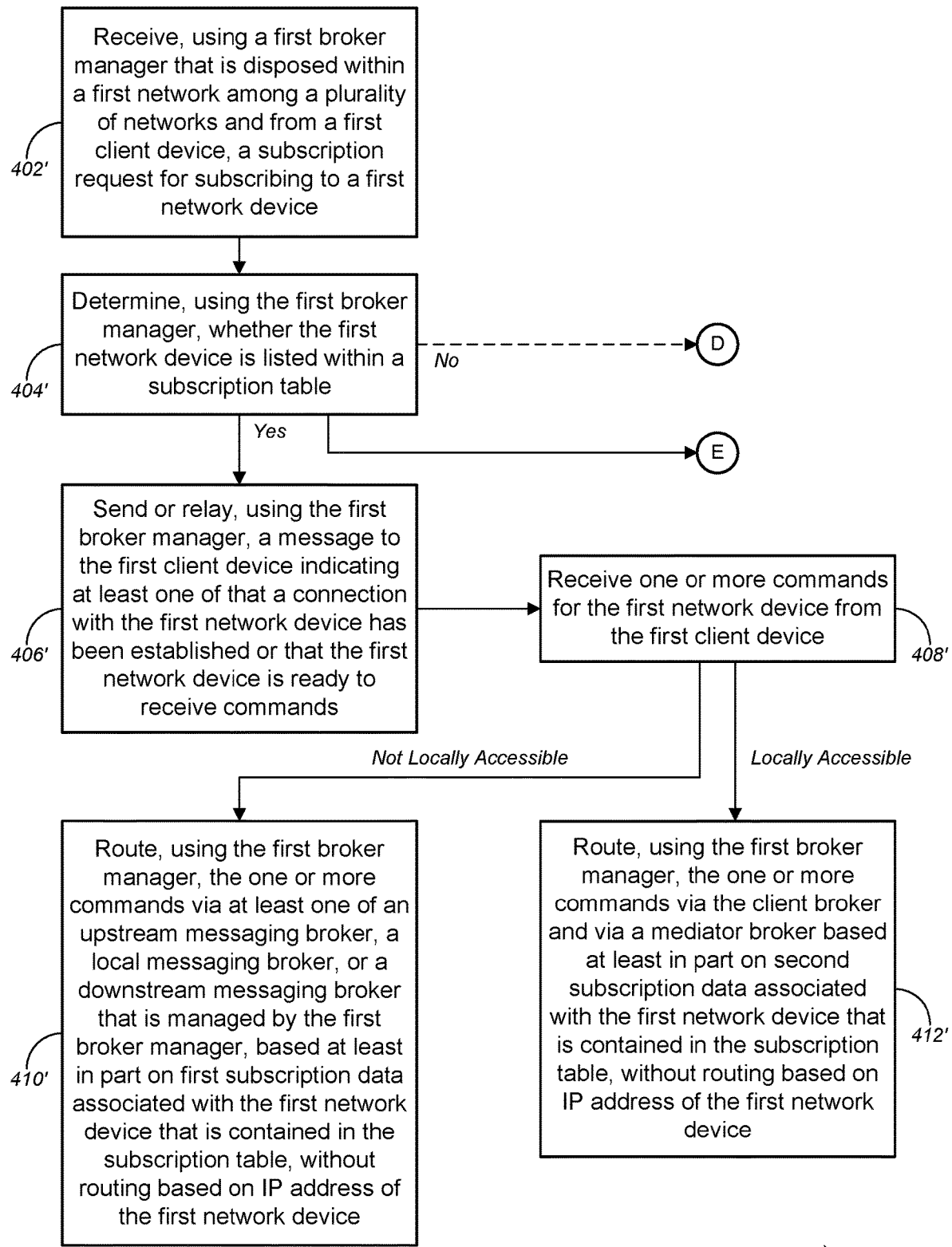

In the non-limiting embodiment of FIG. 4F, method 400, at block 402', may comprise receiving, using a first broker manager that is disposed within a first network among a plurality of networks and from the first client device, a subscription request for subscribing to the first network device. At block 404', method may comprise determining, using the first broker manager, whether the first network device is listed within a subscription table. If not, method 400 may continue onto the process at block 436' in FIG. 4G following the circular marker denoted, "D." If so, method 400 either may continue onto the process at block 406' and/or may continue onto the process at block 420' in FIG. 4H following the circular marker denoted, "E."

At block 406', method 400 may comprise, based on a determination that the first network device is listed within the subscription table, sending or relaying, using the first broker manager, a message to the first client device indicating at least one of that a connection with the first network device has been established or that the first network device is ready to receive commands. In some embodiments, sending or relaying, using the first broker manager, the message to the first client device (at block 406') may comprise sending or relaying, using the first broker manager, a message to the first client device indicating at least one of a sub ack message, a message indicating that one or more publication/subscription ("pub/sub") channels have been created for the first network device in at least the first network and the second network, or a message indicating that one or more intermediate broker managers between the first broker manager and the first network device have joined the one or more pub/sub channels.

Method 400 may further comprise, at block 408', receiving one or more commands for the first network device from the first client device. Method 400 may further comprise, based on a determination that the first network device is not locally accessible by the first broker manager, and, in response to receiving the one or more commands for the first network device from the first client device, routing, using the first broker manager, the one or more commands via at least one of an upstream messaging broker, a local messaging broker, or a downstream messaging broker that is managed by the first broker manager, based at least in part on first subscription data associated with the first network device that is contained in the subscription table, without routing based on IP address of the first network device (block 410'), the first subscription data comprising a name of the first network device and an ID of a second network within which the first network device is located. Alternatively, method 400 may further comprise, based on a determination that the first network device is locally accessible by the first broker manager, and, in response to receiving the one or more commands for the first network device from the first client device, routing, using the first broker manager, the one or more commands via the client broker and via a mediator broker based at least in part on second subscription data associated with the first network device that is contained in the subscription table, without routing based on IP address of the first network device (block 412'), the second subscription data comprising the name of the first network device and an ID of the first network, the mediator broker being managed by the first broker manager.

Figure 4G:
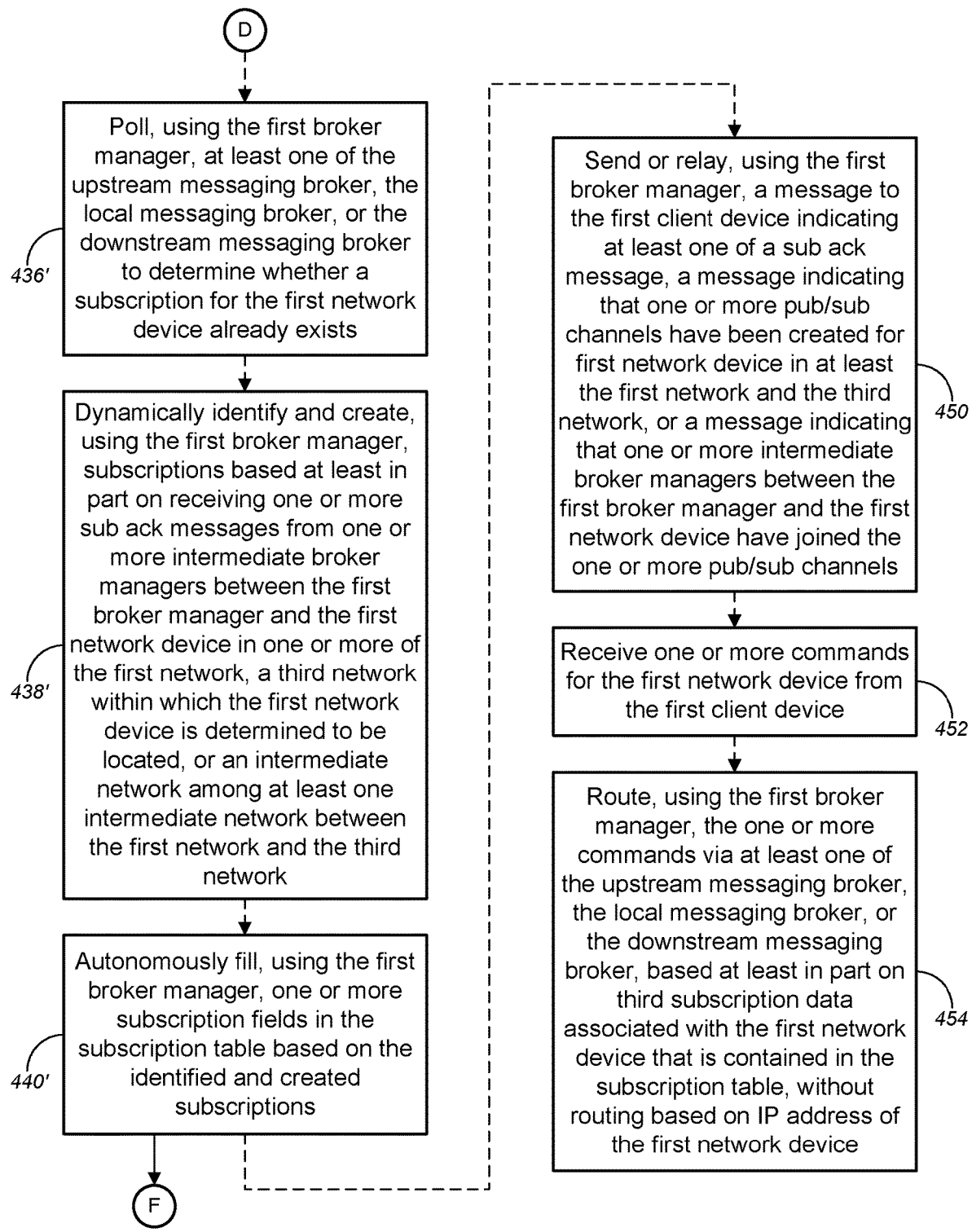

At block 436' in FIG. 4G (following the circular marker denoted, "D," in FIG. 4F), method 400 may comprise polling, using the first broker manager, at least one of the upstream messaging broker, the local messaging broker, or the downstream messaging broker to determine whether a subscription for the first network device already exists. Method 400, at block 438', may comprise dynamically identifying and creating, using the first broker manager, subscriptions based at least in part on receiving one or more sub ack messages from one or more intermediate broker managers between the first broker manager and the first network device in one or more of the first network, a third network within which the first network device is determined to be located, or an intermediate network among at least one intermediate network between the first network and the third network. Method 400 may further comprise autonomously filling, using the first broker manager, one or more subscription fields in the subscription table based on the identified and created subscriptions (block 440'). Method 400 either may continue onto the process at block 450 and/or may continue onto the process at block 428' in FIG. 4I following the circular marker denoted, "F."

At block 450, method 400 may comprise sending or relaying, using the first broker manager, a message to the first client device indicating at least one of a sub ack message, a message indicating that one or more pub/sub channels have been created for the first network device in at least the first network and the third network, or a message indicating that one or more intermediate broker managers between the first broker manager and the first network device have joined the one or more pub/sub channels. Method 400 may further comprise receiving one or more commands for the first network device from the first client device (block 452); and, in response to receiving one or more commands for the first network device from the first client device, routing, using the first broker manager, the one or more commands via at least one of the upstream messaging broker, the local messaging broker, or the downstream messaging broker, based at least in part on third subscription data associated with the first network device that is contained in the subscription table, without routing based on IP address of the first network device (block 454), the third subscription data comprising a name of the first network device and an ID of the third network within which the first network device is located.

At block 420' in FIG. 4H (following the circular marker denoted, "E," in FIG. 4F), method 400 may comprise determining, using the first broker manager, whether any alerts associated with the first network device have been received by an alert manager that is communicatively coupled with the first broker manager. Method 400, at block 422', may comprise performing at least one of the following, without polling other broker managers regarding the status of the first network device and without attempting to connect to the first network device via one or more brokers that are managed by the first broker manager: based on a determination that an alert has been received that indicates that the first network device is offline, sending or relaying, using the first broker manager, a first message to the first client device indicating that the first network device is offline (block 424'); based on a determination that an alert has been received that indicates that a connection to the first network device is currently lost, sending or relaying, using the first broker manager, a second message to the first client device indicating that a connection to the first network device is currently lost (block 426'); or based on a determination that the first network device is locally accessible by the first broker manager when the first network device is not offline and when the connection to the first network devices is not currently lost, sending at least one of the first message to the first client device indicating that the first network device is offline or the second message to the first device indicating that a connection to the first network device is currently lost, without communicatively coupling with a mediator broker between the first broker manager and the first network device (block 456), the mediator broker being managed by the first broker manager; and/or the like.

Method 400 may continue onto the process at block 442 in FIG. 4E following the circular marker denoted, "C."

At block 428' in FIG. 4I (following the circular marker denoted, "F," in FIG. 4G), method 400 may comprise, after receiving a message from at least one other broker manager that is disposed within the plurality of networks indicating that the first network device is offline, updating, using the first broker manager, the subscription table to indicate that the first network device is offline; and sending or relaying, using the first broker manager, a message to the first client device indicating that the first network device is offline (block 430'). Alternatively, or additionally, method 400 (following the circular marker denoted, "B," in FIG. 4A) may comprise, after receiving a message from at least one other broker manager that is disposed within the plurality of networks indicating that a connection to the first network device is currently lost, updating, using the first broker manager, the subscription table to indicate that a connection to the first network device is currently lost (block 432'); and sending or relaying, using the first broker manager, a message to the first client device indicating that a connection to the first network device is currently lost (block 434').

Method 400 may continue onto the process at block 442 in FIG. 4E following the circular marker denoted, "C."

Figure 4J:
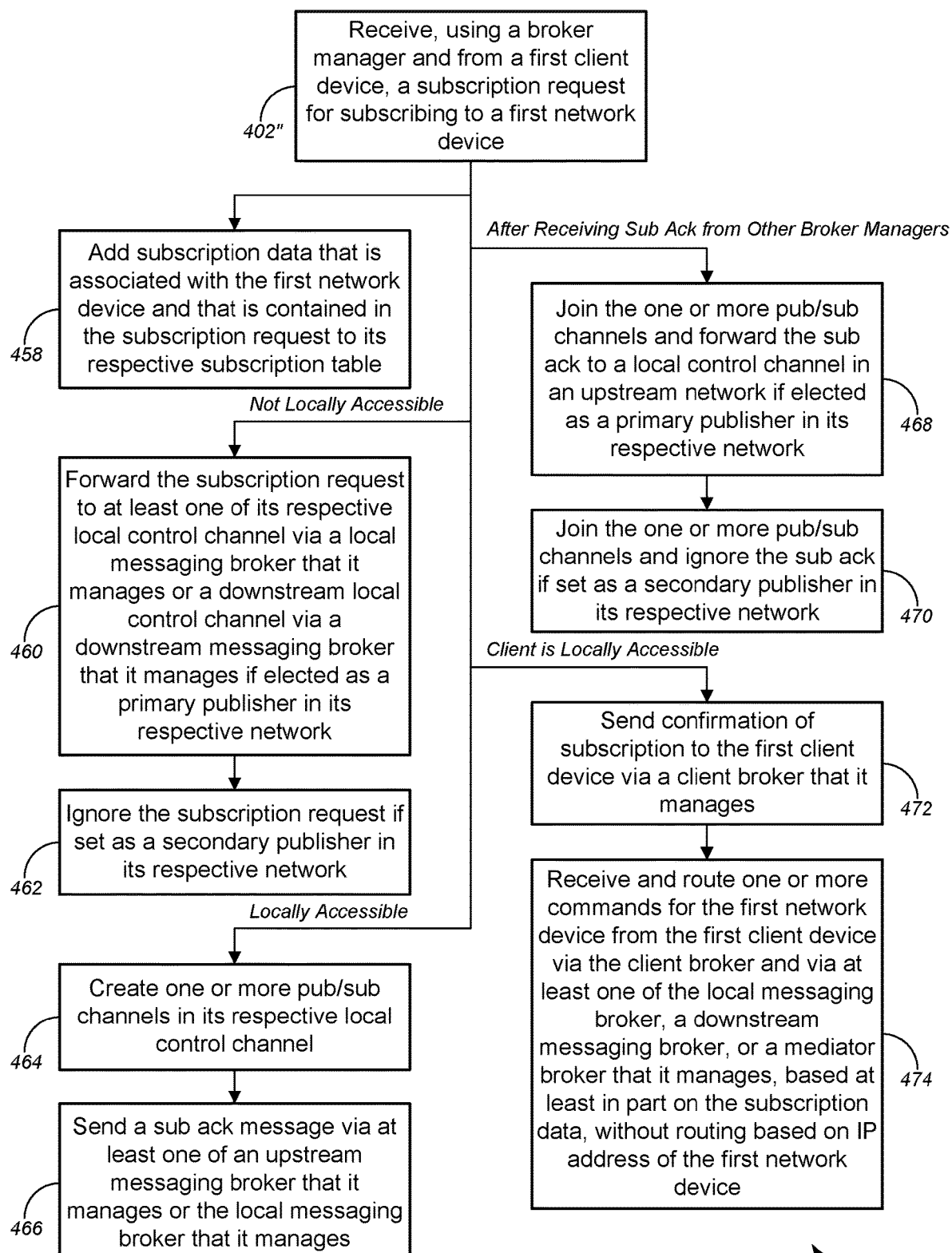

In the non-limiting embodiment of FIG. 4J, method 400, at block 402", may comprise receiving, using a broker manager among a first plurality of broker managers that is disposed within a first network among a plurality of networks and among a second plurality of broker managers that is disposed within a second network among the plurality of networks and from a first client device, a subscription request for subscribing to the first network device. Method 400 may comprise at least one of: adding subscription data that is associated with the first network device and that is contained in the subscription request to its respective subscription table (block 458), the subscription data comprising a name of the first network device and an identifier ("ID") of a second network within which the first network device is located; based on a determination that the first network device is not locally accessible, forwarding the subscription request to at least one of its respective local control channel via a local messaging broker that it manages or a downstream local control channel via a downstream messaging broker that it manages if elected as a primary publisher in its respective network (block 460), and ignoring the subscription request if set as a secondary publisher in its respective network (block 462), wherein the primary publisher in its respective network is elected by other broker managers in its respective network to perform pub/sub functions used in name-based routing, wherein the secondary publisher is on hot standby in its respective network to take over pub/sub functions during failover events involving the primary publisher; based on a determination that the first network device is locally accessible, creating one or more pub/sub channels in its respective local control channel (block 464), and sending a sub ack message via at least one of an upstream messaging broker that it manages or the local messaging broker that it manages (block 466); in response to receiving the sub ack message from another broker manager, joining the one or more pub/sub channels and forwarding the sub ack message to a local control channel in an upstream network if elected as a primary publisher in its respective network (block 468), and joining the one or more pub/sub channels and ignoring the sub ack message if set as a secondary publisher in its respective network (block 470); if the first client device is locally accessible to it, sending confirmation of subscription to the first client device via a client broker that it manages (block 472), and receiving and routing one or more commands for the first network device from the first client device via the client broker and via at least one of the local messaging broker, a downstream messaging broker, or a mediator broker that it manages, based at least in part on the subscription data, without routing based on IP address of the first network device (block 474); and/or the like.

Exemplary System and Hardware Implementation

Figure 5:
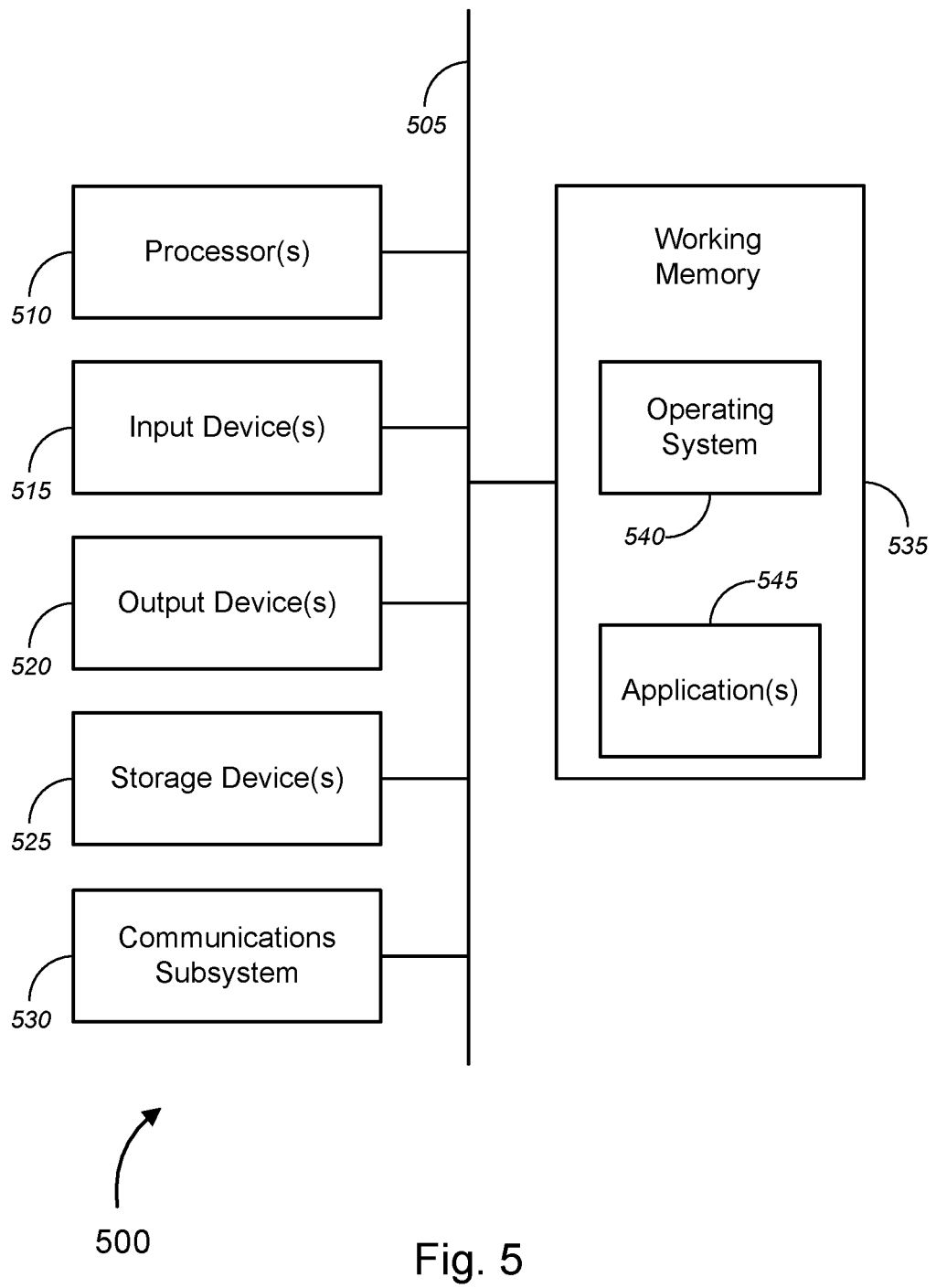
FIG. 5 is a block diagram illustrating an exemplary computer or system hardware architecture, in accordance with various embodiments.

FIG. 5 is a block diagram illustrating an exemplary computer or system hardware architecture, in accordance with various embodiments. FIG. 5 provides a schematic illustration of one embodiment of a computer system 500 of the service provider system hardware that can perform the methods provided by various other embodiments, as described herein, and/or can perform the functions of computer or hardware system (i.e., computing systems 105a105n and 105a'-105n', broker managers 110a110n, 110a'-110n', 210, 210a, 210b, 310a, 310b, 310c, 310d, 310x, and 310y, client brokers 115a-115n, 215, 215a215n, and C, messaging brokers 120a120c, 220a220c, U, L, and D, mediator brokers 125a-125n, 225a225n, and M, subscription tables 130, 230, and S, alert managers 135, 235, and A, client devices 145a-145n, 245a245c, and 345, network element database ("NED") 150 and 350, network devices 155a-155n, 255a255d, and 355, firewalls 160, 260, and 360, control channels 165 and 365a365c, real-time fault management system ("RFM") 170, intermediate devices 280a280d, device send channels 385a385c and device receive channels 390a390c, etc.), as described above. It should be noted that FIG. 5 is meant only to provide a generalized illustration of various components, of which one or more (or none) of each may be utilized as appropriate. FIG. 5, therefore, broadly illustrates how individual system elements may be implemented in a relatively separated or relatively more integrated manner.

The computer or hardware system 500—which might represent an embodiment of the computer or hardware system (i.e., computing systems 105a105n and 105a'-105n', broker managers 110a110n, 110a'-110n', 210, 210a, 210b, 310a, 310b, 310c, 310d, 310x, and 310y, client brokers 115a-115n, 215, 215a215n, and C, messaging brokers 120a120c, 220a220c, U, L, and D, mediator brokers 125a-125n, 225a225n, and M, subscription tables 130, 230, and S, alert managers 135, 235, and A, client devices 145a-145n, 245a245c, and 345, NED 150 and 350, network devices 155a-155n, 255a255d, and 355, firewalls 160, 260, and 360, control channels 165 and 365a365c, RFM 170, intermediate devices 280a280d, device send channels 385a385c and device receive channels 390a390c, etc.), described above with respect to FIGS. 1-4—is shown comprising hardware elements that can be electrically coupled via a bus 505 (or may otherwise be in communication, as appropriate). The hardware elements may include one or more processors 510, including, without limitation, one or more general-purpose processors and/or one or more special-purpose processors (such as microprocessors, digital signal processing chips, graphics acceleration processors, and/or the like); one or more input devices 515, which can include, without limitation, a mouse, a keyboard, and/or the like; and one or more output devices 520, which can include, without limitation, a display device, a printer, and/or the like.

The computer or hardware system 500 may further include (and/or be in communication with) one or more storage devices 525, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 500 might also include a communications subsystem 530, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 530 may permit data to be exchanged with a network (such as the network described below, to name one example), with other computer or hardware systems, and/or with any other devices described herein. In many embodiments, the computer or hardware system 500 will further comprise a working memory 535, which can include a RAM or ROM device, as described above.

The computer or hardware system 500 also may comprise software elements, shown as being currently located within the working memory 535, including an operating system 540, device drivers, executable libraries, and/or other code, such as one or more application programs 545, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 500 and/or might take the form of source and/or installable code, which, upon compilation and/or installation on the computer or hardware system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 500) to perform methods in accordance with various embodiments of the invention. According to a set of embodiments, some or all of the procedures of such methods are performed by the computer or hardware system 500 in response to processor 510 executing one or more sequences of one or more instructions (which might be incorporated into the operating system 540 and/or other code, such as an application program 545) contained in the working memory 535. Such instructions may be read into the working memory 535 from another computer readable medium, such as one or more of the storage device(s) 525. Merely by way of example, execution of the sequences of instructions contained in the working memory 535 might cause the processor(s) 510 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 500, various computer readable media might be involved in providing instructions/code to processor(s) 510 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 525. Volatile media includes, without limitation, dynamic memory, such as the working memory 535. In some alternative embodiments, a computer readable medium may take the form of transmission media, which includes, without limitation, coaxial cables, copper wire, and fiber optics, including the wires that comprise the bus 505, as well as the various components of the communication subsystem 530 (and/or the media by which the communications subsystem 530 provides communication with other devices). In an alternative set of embodiments, transmission media can also take the form of waves (including without limitation radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 500. These signals, which might be in the form of electromagnetic signals, acoustic signals, optical signals, and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc. carried by the signals) to the working memory 535, from which the processor(s) 505 retrieves and executes the instructions. The instructions received by the working memory 535 may optionally be stored on a storage device 525 either before or after execution by the processor(s) 510.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A system, comprising:
a first plurality of broker managers disposed within a first network among a plurality of networks, the plurality of networks being separated from each other by firewalls;
a second plurality of broker managers disposed within a second network among the plurality of networks; and
a first network device among a plurality of network devices, the first network device being disposed in the second network;
wherein:
in response to receiving a subscription request from a first client device for subscribing to the first network device, each broker manager among the first plurality of broker managers and among the second plurality of broker managers is configured to perform at least one of:
adding subscription data that is associated with the first network device and that is contained in the subscription request to its respective subscription table, the subscription data comprising a name of the first network device and an identifier ("ID") of a second network within which the first network device is located;
based on a determination that the first network device is not locally accessible, forwarding the subscription request to at least one local control channel via a messaging broker that it manages if elected as a primary publisher in its respective network, and ignoring the subscription request if set as a secondary publisher in its respective network; or
based on a determination that the first network device is locally accessible, creating one or more publication/subscription ("pub/sub") channels in its respective local control channel, and sending a subscription acknowledgement ("sub ack") message via the messaging broker that it manages.

2. The system of claim 1, wherein:
in response to receiving the subscription request from a first client device for subscribing to the first network device, each broker manager among the first plurality of broker managers and among the second plurality of broker managers is further configured to perform at least one of:
in response to receiving the sub ack message from another broker manager, joining the one or more pub/sub channels, forwarding the sub ack message to a local control channel in an upstream network if elected as a primary publisher in its respective network, and ignoring the sub ack message if set as a secondary publisher in its respective network; or if the first client device is locally accessible to it, sending confirmation of subscription to the first client device via a client broker that it manages, and receiving and routing one or more commands for the first network device from the first client device via the client broker and via at least one of the messaging broker or a mediator broker that it manages, based at least in part on the subscription data, without routing based on Internet Protocol ("IP") address of the first network device.

3. The system of claim 2, wherein:

each broker manager receiving the subscription request comprises each broker manager receiving the subscription request via at least one of a client broker or the messaging that it manages;

the messaging broker for each broker manager (i) communicatively couples with a control channel associated with its respective network, (ii) communicatively couples with a control channel associated with one of its respective network or a downstream intermediate network among one or more downstream intermediate networks between its respective network and the second network, or (iii) communicatively couples with a control channel associated with one of a fourth network within which the client device is disposed if not disposed in the first network or an upstream intermediate network among one or more upstream intermediate networks between the first network and the fourth network, in the case that the first network is disposed between the fourth network and the second network;

the ID of the second network comprises at least one of a name, an alphanumeric ID, a numeric ID, or a unique ID of the second network; and the mediator broker comprises at least one of one or more serial line management ("SLM") mediator brokers, one or more transmission control protocol ("TCP") mediator brokers, one or more hypertext transfer protocol ("HTTP") mediator brokers, one or more secure shell protocol ("SSH") mediator brokers, or one or more simple network management protocol ("SNMP") mediator brokers.

4. The system of claim 3, wherein each of at least one SLM mediator broker among the one or more SLM mediator brokers is configured to mediate multiple connections to multiple client devices regardless of whether the first network device to which it is communicatively coupled is only capable of single client-only connection.

5. The system of claim 3, wherein one or more of the client broker, the messaging broker, or the mediator broker are modular, wherein the client broker is configured to be interchangeable with other client brokers, the messaging broker is configured to be interchangeable with other messaging brokers, and the mediator broker is configured to be interchangeable with other mediator brokers, wherein each broker manager is communicatively coupled to and manages at least one of one or more client brokers, one or more messaging brokers, or one or more mediator brokers, wherein each client broker comprises one of a single-port client broker that communicatively couples with a single client device or a multi-port client broker that communicatively couples with each of a plurality of client devices.

6. The system of claim 1, wherein each subscription table associated a corresponding broker manager among the first plurality of broker managers and among the second plurality of broker managers is maintained and updated within a network element database ("NED").

7. The system of claim 1, wherein the first network device comprises one of a network switch, an intermediary device, a multiservice provisioning platform, a gateway device, a network node, a router, a network security or firewall appliance, a telephone electronic switching system, an optical network switch and routing platform, a wavelength division multiplexing ("WDM") -based optical transport network system, a network transmission system, a server, or a user device.

8. The system of claim 1, further comprising:

a first local control channel disposed in the first network; and a second local control channel disposed in the second network;

wherein:

each of the first local control channel and the second local control channel is clustered across multiple servers in its respective network; and a second primary broker manager communicatively couples with the first network device via its mediator broker.

9. The system of claim 8, wherein:

the first client device is disposed within the first network;

a first primary broker manager communicatively couples with the first client device via its client broker;

the first primary broker manager communicatively couples with the first local control channel via its local messaging broker; and the first primary broker manager communicatively couples with the second local control channel via its downstream messaging broker.

10. The system of claim 9, further comprising:

a third plurality of broker managers disposed within a third network among the plurality of networks, the third network being a downstream intermediate network among one or more downstream intermediate networks between the first network and the second network; and a third local control channel disposed in the third network;

wherein the first primary broker manager communicatively couples with a second local control channel, via a third local control channel and via its downstream messaging broker.

11. The system of claim 8, further comprising:

a fourth plurality of broker managers disposed within a fourth network among the plurality of networks; and a fourth local control channel disposed in the fourth network;

wherein:

the first client device is disposed within the fourth network;

a first primary broker manager communicatively couples with the first client device via the fourth local control channel, via the fourth primary broker manager, and via its upstream messaging broker;

the first primary broker manager communicatively couples with the first local control channel via its local messaging broker; and the first primary broker manager communicatively couples with the second local control channel via its downstream messaging broker.

12. The system of claim 11, further comprising:

a fifth plurality of broker managers disposed within a fifth network among the plurality of networks, the fifth network being an upstream intermediate network among one or more upstream intermediate networks between the first network and the fourth network; and a fifth local control channel disposed in the fifth network;

wherein the first primary broker manager communicatively couples with the fourth local control channel via the fifth local control channel and via its upstream messaging broker.

13. The system of claim 1, wherein:
in response to receiving one or more commands for the first network device from the first client device, each broker manager among the first plurality of broker managers and among the second plurality of broker managers is further configured to perform at least one of:
based on a determination that the first network device is not locally accessible, routing the one or more commands to at least one of its local control channel via its messaging broker that it manages if elected as a primary publisher in its respective network, and ignoring the one or more commands if set as a secondary publisher in its respective network; or
based on a determination that the first network device is locally accessible, routing the one or more commands to the first network device via its mediator broker; and
routing the one or more commands is based at least in part on subscription data associated with the first network device that is contained in the subscription table, without routing based on IP address of the first network device.

14. The system of claim 13, wherein:
in response to receiving a reply from the first network device for the first client device, each broker manager among the first plurality of broker managers and among the second plurality of broker managers is further configured to perform at least one of:
based on a determination that the first client device is not locally accessible, routing the reply to at least one of its local control channel via the messaging broker that it manages if elected as a primary publisher in its respective network, and ignoring the reply if set as a secondary publisher in its respective network; or
based on a determination that the first client device is locally accessible, routing the reply to the first client device via its client broker.

15. The system of claim 1, wherein:
after it initializes or powers on, each broker manager among the first plurality of broker managers and among the second plurality of broker managers is further configured to perform at least one of:
initializing one or more mediator brokers it is managing;
initializing one or more client brokers it is managing;
connecting to at least one of its local control channel via the messaging broker that it manages;
sending a hello message over at least one of its local control channel; or
in response to receiving a hello acknowledgement ("hello ack") message from each of one or more broker managers among the first plurality of broker managers and among the second plurality of broker managers, marking presence of each of the one or more broker managers.

16. The system of claim 1, wherein each broker manager among the first plurality of broker managers and among the second plurality of broker managers comprises at least one of a virtual broker manager, a software-based ("SW") broker manager, or a broker manager software application ("app").

17. A method, comprising:
in response to receiving a subscription request from a first client device for subscribing to a first network device, a broker manager performing at least one of the following, the broker manager being among a first plurality of broker managers that is disposed within a first network among a plurality of networks and among a second plurality of broker managers that is disposed within a second network among the plurality of networks, the plurality of networks being separated from each other by firewalls:
adding subscription data that is associated with the first network device and that is contained in the subscription request to its respective subscription table, the subscription data comprising a name of the first network device and an identifier ("ID") of a second network within which the first network device is located;
based on a determination that the first network device is not locally accessible, forwarding the subscription request to at least one of its local control channel via a messaging broker that it manages if elected as a primary publisher in its respective network, and ignoring the subscription request if set as a secondary publisher in its respective network; or
based on a determination that the first network device is locally accessible, creating one or more publication/subscription ("pub/sub") channels in its local control channel, and sending a subscription acknowledgement ("sub ack") message via the messaging broker that it manages.

18. The method of claim 17, further comprising:
in response to receiving the subscription request from the first client device for subscribing to the first network device, the broker manager further performs at least one of the following:
in response to receiving the sub ack message from another broker manager, a local control channel in an upstream network if elected as a primary publisher in its respective network, and ignoring the sub ack message if set as a secondary publisher in its respective network; or
if the first client device is locally accessible to it, sending confirmation of subscription to the first client device via a client broker that it manages, and receiving and routing one or more commands for the first network device from the first client device via the client broker and via the messaging or a mediator broker that it manages, based at least in part on the subscription data, without routing based on Internet Protocol ("IP") address of the first network device.

19. The method of claim 18, wherein:
receiving the subscription request comprises the broker manager receiving the subscription request via at least one of a client broker, or the messaging broker that it manages;
the messaging broker for each broker manager (i) communicatively couples with a control channel associated with its respective network, (ii) communicatively couples with a control channel associated with one of its respective network or a downstream intermediate network among one or more downstream intermediate networks between its respective network and the second network, or (iii) communicatively couples with a control channel associated with one of a fourth network within which the client device is disposed if not disposed in the first network or an upstream intermediate network among one or more upstream intermediate networks between the first network and the fourth network, in the case that the first network is disposed between the fourth network and the second network;

the ID of the second network comprises at least one of a name, an alphanumeric ID, a numeric ID, or a unique ID of the second network; and the mediator broker comprises at least one of one or more serial line management ("SLM") mediator brokers, one or more transmission control protocol ("TCP") mediator brokers, one or more hypertext transfer protocol ("HTTP") mediator brokers, one or more secure shell protocol ("SSH") mediator brokers, or one or more simple network management protocol ("SNMP") mediator brokers.

20. A system, comprising:

a first plurality of broker managers disposed within a first network among a plurality of networks, the plurality of networks being separated from each other by firewalls;

a second plurality of broker managers disposed within a second network among the plurality of networks;

a first network device among a plurality of network devices, the first network device being disposed in the second network; and a computing system that is disposed within one of the plurality of networks, the computing system comprising:

a broker manager among the first plurality of broker managers and among the second plurality of broker managers;

at least one first processor; and a first non-transitory computer readable medium communicatively coupled to the at least one first processor, the first non-transitory computer readable medium having stored thereon computer software comprising a first set of instructions that, when executed by the at least one first processor, causes the broker manager to:

in response to receiving a subscription request from a first client device for subscribing to the first network device, add subscription data that is associated with the first network device and that is contained in the subscription request to its respective subscription table, the subscription data comprising a name of the first network device and an identifier ("ID") of a second network within which the first network device is located;

based on a determination that the first network device is not locally accessible, forward the subscription request to at least one of its local control channel via a messaging broker that it manages if elected as a primary publisher in its respective network, and ignore the subscription request if set as a secondary publisher in its respective network; or based on a determination that the first network device is locally accessible, create one or more publication/subscription ("pub/sub") channels in its respective local control channel, and send a subscription acknowledgement ("sub ack") message via the messaging broker that it manages.

\* \* \* \* \*